(12) United States Patent
Hahn et al.

(10) Patent No.: US 11,518,472 B2
(45) Date of Patent: Dec. 6, 2022

(54) BICYCLE CONTROL SYSTEM

(71) Applicant: SRAM, LLC, Chicago, IL (US)

(72) Inventors: Sage Hahn, Chicago, IL (US); Brian Jordan, Highland Park, IL (US); Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 236 days.

(21) Appl. No.: 16/787,893

(22) Filed: Feb. 11, 2020

(65) Prior Publication Data
US 2020/0262511 A1 Aug. 20, 2020

Related U.S. Application Data

(60) Provisional application No. 62/806,306, filed on Feb. 15, 2019.

(51) Int. Cl.
| | | |
|---|---|---|
| *B62M 6/45* | (2010.01) | |
| *B62M 6/50* | (2010.01) | |
| *B62M 9/132* | (2010.01) | |

(52) U.S. Cl.
CPC .............. *B62M 6/45* (2013.01); *B62M 6/50* (2013.01); *B62M 9/132* (2013.01)

(58) Field of Classification Search
CPC .......... B62M 6/45; B62M 6/50; B62M 9/132; B60L 2240/429; B60L 2250/22; B60L 3/0007; B60L 2200/12; B60L 2240/461; B60L 2240/463; B60L 50/20; B60W 2300/36; Y02T 10/64; B60K 28/14; B62J 27/00; B62J 99/00
See application file for complete search history.

(56) References Cited

U.S. PATENT DOCUMENTS

| | | | |
|---|---|---|---|
| 4,490,127 | A | 12/1984 | Matsumoto |
| 5,941,332 | A | 8/1999 | Dimick |
| 5,941,333 | A | 8/1999 | Sun et al. |
| 6,007,447 | A | 12/1999 | Lin |
| 6,012,538 | A | 1/2000 | Sonobe et al. |
| 6,047,230 | A | 4/2000 | Spencer et al. |
| 6,152,249 | A | 11/2000 | Li et al. |
| 6,152,250 | A | 11/2000 | Shu-Hsien |
| 6,196,347 | B1 | 3/2001 | Chao et al. |
| 6,276,479 | B1 | 8/2001 | Suzuki et al. |
| 6,629,574 | B2 | 10/2003 | Turner |
| 8,738,212 | B1 | 5/2014 | Schieffelin |
| 9,090,178 | B2 | 7/2015 | Tsuchizawa |
| 9,114,850 | B2 | 8/2015 | Tanaka et al. |
| 9,234,580 | B1 | 1/2016 | Usui et al. |

(Continued)

FOREIGN PATENT DOCUMENTS

| | | |
|---|---|---|
| CN | 1515453 A | 7/2004 |
| CN | 1600633 A | 3/2005 |

(Continued)

*Primary Examiner* — Richard M Camby

(57) ABSTRACT

A bicycle with an electric pedal assist motor capable of driving a chainring independent of cranks includes wheel speed sensors and crank cadence sensors. The wheel speed sensors and the crank cadence sensors measure wheel speed and crank cadence, respectively, and provide the measured wheel speed and crank cadence to controller of the bicycle. The controller activates motor overdrive based on the measured wheel speed and/or the measured crank cadence.

18 Claims, 10 Drawing Sheets

(56) References Cited

U.S. PATENT DOCUMENTS

| | | |
|---|---|---|
| 9,260,035 B2 | 2/2016 | Chun et al. |
| 9,447,869 B2 | 9/2016 | Tetsuka et al. |
| 9,656,672 B2 | 5/2017 | Schieffelin |
| 10,300,809 B2 | 5/2019 | Lee |
| 10,313,445 B2 | 6/2019 | Ostergaard et al. |
| 2005/0075774 A1 | 4/2005 | Takamoto et al. |
| 2013/0054065 A1 | 2/2013 | Komatsu |
| 2013/0054067 A1 | 2/2013 | Shoge |
| 2013/0054068 A1 | 2/2013 | Shoge |
| 2013/0267376 A1 | 10/2013 | Takachi |
| 2014/0088806 A1 | 3/2014 | Lee |
| 2015/0088389 A1 | 3/2015 | Gao |
| 2015/0307157 A1 | 10/2015 | Gao |
| 2015/0360747 A1 | 12/2015 | Baumgaertner et al. |
| 2016/0009275 A1 | 1/2016 | Hieda et al. |
| 2016/0052594 A1 | 2/2016 | Kimmich |
| 2016/0121198 A1* | 5/2016 | Doerksen ............... B60L 50/52 701/22 |
| 2016/0257373 A1 | 9/2016 | Emura |
| 2017/0106866 A1 | 4/2017 | Schieffelin |
| 2018/0118305 A1 | 5/2018 | Tsuchizawa et al. |
| 2018/0197401 A1 | 7/2018 | Khaligh et al. |
| 2018/0257736 A1* | 9/2018 | Komatsu ............... B62K 25/08 |
| 2018/0257737 A1* | 9/2018 | Komatsu ............... B62M 9/132 |
| 2019/0126759 A1* | 5/2019 | Miller ................. B60L 7/18 |
| 2019/0176930 A1* | 6/2019 | Wiegel ................ F16D 41/24 |
| 2019/0300113 A1 | 10/2019 | Wesling |
| 2020/0079467 A1 | 3/2020 | Takayama |

FOREIGN PATENT DOCUMENTS

| | | |
|---|---|---|
| CN | 102963486 A | 3/2013 |
| CN | 102963487 A | 3/2013 |
| CN | 103661786 A | 3/2014 |
| CN | 104443246 A | 3/2015 |
| CN | 106184602 A | 12/2016 |
| CN | 207000726 U | 2/2018 |
| CN | 108016562 A | 5/2018 |
| CN | 108622296 A | 10/2018 |
| DE | 102017009847 A1 | 4/2018 |
| DE | 102016225489 A1 | 6/2018 |
| EP | 1518785 A2 | 3/2005 |
| EP | 3072797 A1 | 9/2016 |
| EP | 3127799 A1 | 2/2017 |
| JP | 2010055261 A | 3/2010 |
| KR | 101885715 B1 | 9/2018 |
| TW | 201204596 A | 2/2012 |
| TW | 201313547 A | 4/2013 |
| TW | 201313549 A | 4/2013 |
| TW | 201412600 A | 4/2014 |
| TW | 201437089 A | 10/2014 |
| TW | 201500259 A | 1/2015 |
| TW | 201512025 A | 4/2015 |
| TW | 201815623 A | 5/2018 |
| WO | 2011072942 A1 | 6/2011 |
| WO | 2012093435 A1 | 7/2012 |
| WO | 2015073791 A1 | 5/2015 |
| WO | 2016130833 A1 | 8/2016 |

* cited by examiner

BICYCLE CONTROL SYSTEM

PRIORITY

This application claims the benefit of U.S. Provisional Patent Application No. 62/806,306, filed on, which is hereby incorporated by reference in its entirety.

BACKGROUND

1. Field of the Disclosure

The present disclosure is generally directed to an electric bicycle, and more particularly, to control of the electric bicycle.

2. Description of Related Art

A bicycle with a pedal assist electric motor (e.g., an electric bicycle or an ebike) may include wheel speed and crank speed sensors that may be used as inputs to automatic shifting algorithms for a transmission of the bicycle. One limitation of the automatic shifting algorithm for the transmission of the bicycle is that shifting may only occur when the drivetrain is moving (e.g., when a rider is pedaling).

The pedal assist motor may turn a driving chainring independent of cranks of the bicycle. This aspect exists so that when the assist motor is active, the rider does not sense motor torque in the legs of the rider if the rider slows a pedaling rate faster than the assist motor may react. In some ebike systems, this function is exploited as a feature in which the rider may be walking beside the ebike and may push a button to enable the motor assist at a low speed to help push the ebike up a steep incline without the cranks and pedals rotating unsafely.

SUMMARY

In one example, a method for controlling one or more electrically powered components of a bicycle includes identifying, by a processor in communication with an electrically powered component of the one or more electrically powered components, sensor data. The sensor data identifies a state of the bicycle. The method also includes determining, by the processor, a rider engagement status based on the identified sensor data, and stopping or preventing, by the processor, movement of the electrically powered component based on the determined rider engagement status.

In one example, identifying the sensor data includes receiving, by the processor, orientation data from one or more orientation sensors of the bicycle. The method further includes determining, by the processor, an orientation of the bicycle based on the received orientation data. Determining the rider engagement status includes determining whether a user is riding the bicycle based on the determined orientation of the bicycle. Stopping or preventing movement of the electrically powered component based on the rider engagement status includes stopping or preventing movement of the electrically powered component when the determined rider engagement status indicates the user is not riding the bicycle.

In one example, receiving orientation data from one or more orientation sensors of the bicycle includes receiving orientation data from at least one accelerometer at a predetermined interval. Determining the orientation of the bicycle includes averaging a portion of the received orientation data and determining the orientation of the bicycle based on the averaged portion of the received orientation data.

In one example, determining the rider engagement status based on the identified sensor data includes determining whether the bicycle is subject to a predetermined deacceleration based on the identified sensor data.

In one example, the electrically powered component is an assist motor, stopping or preventing movement of the electrically powered component includes stopping or preventing movement of the assist motor when the determined rider engagement status indicates that the user is subject to the predetermined deacceleration.

In one example, the electrically powered component is a first electrically powered component, and the one or more electrically powered components include a second electrically powered component. The first electrically powered component is an assist motor, and the second electrically powered component is a derailleur motor. The method further includes stopping or preventing, by the processor, movement of the second electrically powered component based on the determined rider engagement status.

In one example, identifying the sensor data includes receiving bicycle orientation data from one or more orientation sensors of the bicycle, receiving wheel speed data from one or more wheel speed sensors of the bicycle, receiving crank speed data from one or more cadence sensors, receiving strain data from one or more strain gauges of the bicycle, receiving acceleration data from one or more accelerometers, one or more gyroscopes, or a combination thereof, or any combination thereof.

In one example, the wheel speed data includes first wheel speed data and second wheel speed data. Identifying the sensor data includes receiving the first wheel speed data from a first wheel speed sensor. The received first wheel speed data represents a first wheel speed. The first wheel speed is a wheel speed of a first wheel of the bicycle. Identifying the sensor data also includes receiving the second wheel speed data from a second wheel speed sensor. The received second wheel speed data represents a second wheel speed. The second wheel speed is a wheel speed of a second wheel of the bicycle. Determining the rider engagement status includes comparing the first wheel speed data to the second wheel speed data and determining the rider engagement status based on the comparison.

In one example, comparing the first wheel speed data to the second wheel speed data includes calculating a difference between the first wheel speed and the second wheel speed. Determining the rider engagement status based on the comparison includes determining the rider engagement status based on the calculated difference.

In one example, determining the rider engagement status based on the calculated difference includes comparing the calculated difference to a predetermined difference, and determining the bicycle is supported off a surface, on which the bicycle is supportable, when the calculated difference is greater than the predetermined difference. Stopping or preventing movement of the electrically powered component based on the determined rider engagement status includes stopping or preventing movement of the electrically powered component when the bicycle is determined to be supported off the surface.

In one example, a method for controlling an electric bicycle includes receiving, by a processor, first sensor data from a first sensor of the electric bicycle, and receiving, by the processor, second sensor data from a second sensor of the electric bicycle. The method also includes identifying, by the processor, based on the first sensor data and the second sensor data, whether the electric bicycle is supported, such that a wheel of the electric bicycle is drivable without translation of the electric bicycle. The method includes preventing, by the processor, movement of an electrically powered component of the electric bicycle based on the identifying.

In one example, receiving the first sensor data from the first sensor includes receiving first wheel speed data from a first wheel speed sensor. The first wheel speed data represents a wheel speed of a first wheel of the electric bicycle. Receiving the second sensor data from the second sensor includes receiving second wheel speed data from a second wheel speed sensor. The second wheel speed data represents a wheel speed of a second wheel of the electric bicycle. The identifying includes comparing the first wheel speed to the second wheel speed. Preventing movement of the electrically powered component includes preventing movement of the electrically powered component based on the comparison of the first wheel speed to the second wheel speed.

In one example, comparing the first wheel speed to the second wheel speed includes determining a difference between the first wheel speed and the second wheel speed. The identifying further includes comparing the determined difference to a predetermined difference. Preventing movement of the electrically powered component includes preventing movement of the electrically powered component based on the comparison of the determined difference to the predetermined difference.

In one example, the method further includes, after preventing the movement of the electrically powered component of the electric bicycle, receiving, by the processor, a user input, and allowing the movement of the electrically powered component of the electric bicycle based on the received user input.

In one example, receiving the first sensor data from the first sensor includes one of receiving bicycle orientation data from an orientation sensor of the electric bicycle, receiving first wheel speed data from a first wheel speed sensor of the electric bicycle, receiving second wheel speed data from a second wheel speed sensor of the electric bicycle, receiving crank speed data from a cadence sensor of the electric bicycle, receiving strain data from a strain gauge of the electric bicycle, and receiving acceleration data from an accelerometer, a gyroscope, or a combination thereof. Receiving the second sensor data from the second sensor includes another of receiving bicycle orientation data from an orientation sensor of the electric bicycle, receiving first wheel speed data from a first wheel speed sensor of the electric bicycle, receiving second wheel speed data from a second wheel speed sensor of the electric bicycle, receiving crank speed data from a cadence sensor of the electric bicycle, receiving strain data from a strain gauge of the electric bicycle, and receiving acceleration data from an accelerometer, a gyroscope, or a combination thereof.

In one example, receiving the first sensor data from the first sensor includes receiving strain data from a strain gauge of a crank arm, a frame, a handlebar, or a seat of the electric bicycle.

In one example, a method for controlling electronic shifting of a bicycle includes determining, by a processor, whether the bicycle is moving based on first sensor data received from a first sensor of the bicycle. When the bicycle is determined to be moving, the method further includes determining, by the processor, a rider engagement status. The determining of the rider engagement status includes identifying, by the processor, second sensor data from a second sensor of the bicycle, identifying, by the processor, third sensor data from a third sensor of the bicycle, and determining the rider engagement status based on the second sensor data and the third sensor data. When the determined rider engagement status indicates the bicycle is being ridden, the method includes enabling use of an assist motor for the electronic shifting of the bicycle.

In one example, the method further includes identifying the first sensor data. Identifying the first sensor data includes receiving wheel speed data from a wheel speed sensor of the bicycle. Identifying the second sensor data includes receiving crank strain data from a strain gauge at a crank of the bicycle. Identifying the third sensor data includes receiving crank speed data from a crank speed sensor of the bicycle. Determining the rider engagement status includes calculating, by the processor, an input power based on the received crank strain data and the received crank speed data, comparing the calculated input power to a predetermined threshold power, and determining the rider engagement status based on the comparison of the calculated input power to the predetermined threshold power.

In one example, when the bicycle is determined to not be moving, the method includes, disabling the use of the assist motor for the electronic shifting of the bicycle In one example, the method further includes identifying, by the processor, a motor current of the assist motor. The method further includes comparing, by the processor, the identified motor current of the assist motor to a predetermined maximum motor current, and, based on the comparison, disabling the use of the assist motor for the electronic shifting of the bicycle when the identified motor current of the assist motor is greater than the predetermined maximum motor current.

In one example, a method for controlling electronic shifting of a bicycle includes determining, by a processor, whether the bicycle is moving. When the bicycle is determined to be moving, the method further includes determining, by the processor, whether the bicycle is being pedaled. When the bicycle is determined to be free of pedaling, the method includes causing an assist motor of the bicycle to provide power to a drive train of the bicycle for the electronic shifting of the bicycle.

In one example, determining whether the bicycle is moving includes receiving, by the processor, wheel speed data from a wheel speed sensor of the bicycle, and determining whether the bicycle is moving based on the received wheel speed data.

In one example, determining whether the bicycle is being pedaled includes receiving, by the processor, crank data from one or more crank sensors of the bicycle, and determining whether the bicycle is being pedaled based on the received crank data.

In one example, receiving crank data from the one or more crank sensors comprises receiving crank cadence data from a cadence sensor of the bicycle, receiving crank angular position data from an angular position sensor of the bicycle, receiving crank angular velocity data from an angular velocity sensor of the bicycle, or any combination thereof.

In one example, when the bicycle is determined as being pedaled, the method further includes estimating, by the processor, continuously or at a predetermined interval, an angular position of the crank arm based on the received crank data, and causing the assist motor of the bicycle to provide power to the drive train of the bicycle for the electronic shifting of the bicycle when the estimated angular position of the crank arm matches a predetermined angular position of the crank arm.

In one example, the predetermined angular position of the crank arm corresponds to a vertical position of the crank arm.

In one example, causing the assist motor of the bicycle to provide power to the drive train of the bicycle for the electronic shifting of the bicycle includes causing the assist motor of the bicycle to provide power to the drive train of the bicycle for a period of time such that a single gear is shifted.

In one example, the determining of whether the bicycle is moving, the determining of whether the bicycle is being pedaled, and the causing of the assist motor of the bicycle to provide power to the drive train of the bicycle for the electronic shifting of the bicycle are part of a mode of operation of the bicycle. The method further includes initiating, by the processor, the mode of operation of the bicycle.

In one example, the method further includes receiving a user input. Initiating the mode of operation of the bicycle includes initiating the mode of operation of the bicycle based on the received user input.

In one example, initiating the mode of operation of the bicycle includes automatically initiating the mode of operation of the bicycle when the bicycle is determined to be moving and the bicycle is determined to be free of pedaling.

In one example, the method further includes receiving, by the processor, wheel speed data from a wheel speed sensor of the bicycle continuously or at a predetermined interval. After the mode of operation of the bicycle is initiated, the method includes controlling the assist motor for the electronic shifting of the bicycle based on the received wheel speed data.

In one example, a controller for a bicycle includes a processor configured to determine whether the bicycle is moving. The processor is further configured, when the bicycle is determined to be moving, to determine whether the bicycle is being pedaled. The processor is configured, when the bicycle is determined to be free of pedaling, cause an assist motor of the bicycle to provide power to a drive train of the bicycle for electronic shifting of the rear derailleur.

In one example, the determination of whether the bicycle is moving includes receipt, by the processor, of wheel speed data from a wheel speed sensor of the bicycle, and determination of whether the bicycle is moving based on the received wheel speed data.

In one example, the determination of whether the bicycle is being pedaled includes receipt, by the processor, of crank data from one or more crank sensors of the bicycle, and determination of whether the bicycle is being pedaled based on the received crank data. The crank data represents a crank speed, a crank cadence, or the crank speed and the crank cadence of a crank arm of the bicycle.

In one example, the processor is further configured to estimate, continuously or at a predetermined interval, an angular position of the crank arm based on the received crank data. The causing of the assist motor of the bicycle to provide power to the drive train of the bicycle for electronic shifting of the rear derailleur includes causing the assist motor of the bicycle to provide power to the drive train of the bicycle for the electronic shifting of the rear derailleur when the estimated angular position of the crank arm matches a predetermined angular position of the crank arm In one example, the predetermined angular position of the crank arm corresponds to a vertical position of the crank arm.

In one example, a method for controlling electronic shifting of a bicycle includes receiving, by a processor, wheel speed data from a wheel speed sensor of the bicycle, and determining, by the processor, whether the bicycle is moving based on the received wheel speed data. When the bicycle is determined to be moving, the method further comprises identifying, by the processor, crank data representing a crank speed, a crank cadence, or the crank speed and the crank cadence of a crank arm of the bicycle, and determining whether the bicycle is being pedaled based on the identified crank data. When the bicycle is determined to be free of pedaling, the method includes causing an assist motor of the bicycle to provide power to a drive train of the bicycle for the electronic shifting of the bicycle In one example, identifying the crank data includes receiving, by the processor, the crank data from one or more crank sensors of the bicycle.

In one example, the method further includes, when the bicycle is determined as being pedaled, estimating, by the processor, continuously or at a predetermined interval, an angular position of the crank arm based on the received crank data, and causing the assist motor of the bicycle to provide power to the drive train of the bicycle for the electronic shifting of the bicycle when the estimated angular position of the crank arm matches a predetermined angular position of the crank arm.

In one example, receiving wheel speed data from the wheel speed sensor of the bicycle includes receiving wheel speed data from the wheel speed sensor of the bicycle continuously or at a predetermined interval. The method further includes, after causing the assist motor of the bicycle to provide power to the drive train of the bicycle for the electronic shifting of the bicycle, controlling the assist motor for the electronic shifting of the bicycle based on the received wheel speed data.

In one example, a method for controlling electronic shifting of a bicycle includes identifying, by a processor, first sensor data. The first sensor data represents a state of the bicycle or an environment in which the bicycle is being ridden. The method also includes initiating automatic control of the electronic shifting of the bicycle based on the identified sensor data or a user input. The automatic control of the electronic shifting of the bicycle includes identifying, by the processor, a cadence of a crank arm of the bicycle from second sensor data, comparing, by the processor, the identified cadence to a predetermined target cadence, and initiating, by the processor, the electronic shifting of the bicycle based on the comparison. The initiating of the electronic shifting of the bicycle includes actuating a motor of the bicycle for the electronic shifting of the bicycle when the identified cadence is less than a threshold cadence.

In one example, identifying the first sensor data includes receiving, by the processor, orientation data from one or more orientation sensors of the bicycle. The orientation data represents an orientation of the bicycle. Identifying the first sensor data also includes receiving, by the processor, wheel speed data from a wheel speed sensor.

In one example, the second sensor data includes crank speed data. Identifying the cadence of the crank arm of the bicycle from the second sensor data includes receiving, by the processor, the crank speed data from one or more cadence sensors of the bicycle.

In one example, comparing the identified cadence to the predetermined target cadence includes determining a difference between the identified cadence and the predetermined target cadence. Initiating the electronic shifting of the bicycle based on the comparison includes initiating the electronic shifting of the bicycle when the determined difference is greater than a predetermined difference. The method further includes identifying, by the processor, a target gear based on the determined difference and a predetermined gear ratio table. Initiating the electronic shifting of the bicycle includes shifting a derailleur of the bicycle to the identified target gear.

In one example, the method further includes receiving, by the processor, a signal generated in response to a user input, and stopping the automatic control of the electronic shifting of the bicycle based on the received signal.

In one example, the method further includes receiving, by the processor, a signal generated in response to a user input. The received signal indicates a derailleur of the bicycle is to be shifted. The method further includes shifting the derailleur based on the received signal.

In one example, the method further includes ending or pausing the automatic control of the electronic shifting in response to the receiving of the signal.

In one example, a method for controlling electronic shifting of a bicycle includes initiating, by a processor, automatic control of the electronic shifting of the bicycle. The method further includes identifying, by the processor, a minimum gear, beyond which a derailleur is not shiftable during the automatic control of the electronic shifting when the bicycle is in a particular state, and receiving, by the processor, cadence data from a cadence sensor of the bicycle. After the initiating of the automatic control of the electronic shifting, the method includes identifying, by the processor, a target gear based on the received cadence data, and comparing, by the processor, the identified target gear to the identified minimum gear. The method also includes preventing or allowing, by the processor, the shifting of the derailleur of the bicycle to the identified target gear based on the comparison.

In one example, the method further includes determining, by the processor, whether the bicycle is being pedaled based on the received cadence data. The shifting of the derailleur of the bicycle to the identified target gear is prevented or allowed based on the determination of whether the bicycle is being pedaled.

In one example, preventing or allowing the shifting of the derailleur of the bicycle to the identified target gear based on the determination of whether the bicycle is being pedaled includes allowing the shifting of the derailleur of the bicycle to the identified target gear when the bicycle is determined to be pedaled.

In one example, allowing the shifting of the derailleur of the bicycle to the identified target gear when the bicycle is determined to be pedaled includes actuating a motor of the bicycle for the electronic shifting of the bicycle when the identified cadence is less than a threshold cadence.

In one example, the method further includes receiving, by the processor, strain data from a strain gauge of the bicycle, and determining, by the processor, a torque on the bicycle based on the received strain data. The method also includes comparing the determined torque to a predetermined threshold torque. The shifting of the derailleur of the bicycle to the identified target gear is prevented or allowed based on the comparison of the determined torque to the predetermined threshold torque.

In one example, the method further includes receiving, by the processor, a signal generated in response to a user input. The received signal includes shift instructions. The method also includes stopping the automatic control of the electronic shifting of the bicycle in response to the received signal and shifting the derailleur of the bicycle based on the received shift instructions.

In one example, the method further includes receiving, by the processor, orientation data from an orientation sensor of the bicycle. The orientation data represents an orientation of the bicycle. The method also includes determining, by the processor, whether the bicycle is traveling up an incline based on the received orientation data. Preventing or allowing the shifting of the derailleur of the bicycle to the identified target gear based on the comparison includes, when the identified target gear is beyond the identified minimum gear, allowing the shifting of the derailleur of the bicycle to the identified target gear when the bicycle is determined to be traveling up the incline.

In one example, the method further includes adjusting, by the processor, the minimum gear.

In one example, a method for controlling electronic shifting of a bicycle includes initiating, by a processor, automatic control of the electronic shifting of the bicycle. The automatic control of the electronic shifting of the bicycle includes identifying, by the processor, a first cadence of a crank arm of the bicycle from cadence data, and comparing, by the processor, the identified first cadence to a target cadence. The method also includes initiating, by the processor, the electronic shifting of the bicycle based on the comparison of the identified first cadence to the target cadence, receiving, by the processor, a signal generated in response to a user input, and adjusting, by the processor, the target cadence based on the received signal. The method includes identifying, by the processor, a second cadence of the crank arm from the cadence data, comparing, by the processor, the identified second cadence to the adjusted target cadence, and initiating, by the processor, the electronic shifting of the bicycle based on the comparison of the identified second cadence to the adjusted target cadence.

In one example, initiating the electronic shifting of the bicycle based on the comparison of the identified first cadence to the target cadence includes identifying a target gear based on the comparison of the identified first cadence to the target cadence and a gear ratio table.

In one example, the target gear is a first target gear. The automatic control of the electronic shifting of the bicycle further includes adjusting the gear ratio table based on the adjusted target cadence. Initiating the electronic shifting of the bicycle based on the comparison of the identified second cadence to the adjusted target cadence includes identifying a second target gear based on the comparison of the identified second cadence to the adjusted target cadence and the adjusted gear ratio table.

In one example, the received signal is a first received signal, the user input is a first user input, and the adjusted target cadence is a first adjusted target cadence. The method further includes receiving, by the processor, a second signal generated in response to a second user input. The second signal represents a request for adjustment of the first adjusted target cadence to a second adjusted target cadence. The method also includes comparing, by the processor, the second adjusted target cadence to a predetermined cadence range, and based on the comparison of the second adjusted target cadence to the predetermined cadence range, maintaining the first adjusted target cadence as a target cadence when the second adjusted target cadence is outside of the predetermined cadence range.

In one example, the signal is a first signal, and the user input is a first user input. The method further includes receiving, by the processor, a second signal generated in response to a second user input. The second signal identifies a shift request. The method also includes disabling the automatic control of the electronic shifting of the bicycle for a predetermined amount of time based on the receiving of the second signal, and shifting the derailleur based on the received second signal.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

A bicycle with an electric pedal assist motor capable of driving a chainring independent of cranks is provided. The bicycle includes wheel speed sensors and crank cadence sensors. The wheel speed sensors and the crank cadence sensors measure wheel speed and crank cadence, respectively, and provide the measured wheel speed and crank cadence to an electric rear derailleur or a controller of the bicycle. The electric rear derailleur, for example, is configured to instruct an e-bike controller to activate motor overdrive based on the measured wheel speed and/or the measured crank cadence.

The rear derailleur, for example, and, more specifically, shifting by the rear derailleur may be configured based on a selected ride mode. The ride mode may be selected from a number of different ride modes, and the controller or another controller of the bicycle may switch between two or more of the different ride modes. Within each of the different ride modes, characteristics of the shifting such as, for example, gear hysteresis, a minimum gear to shift to without pedaling, and/or other characteristics may be adjusted.

Figure 1:
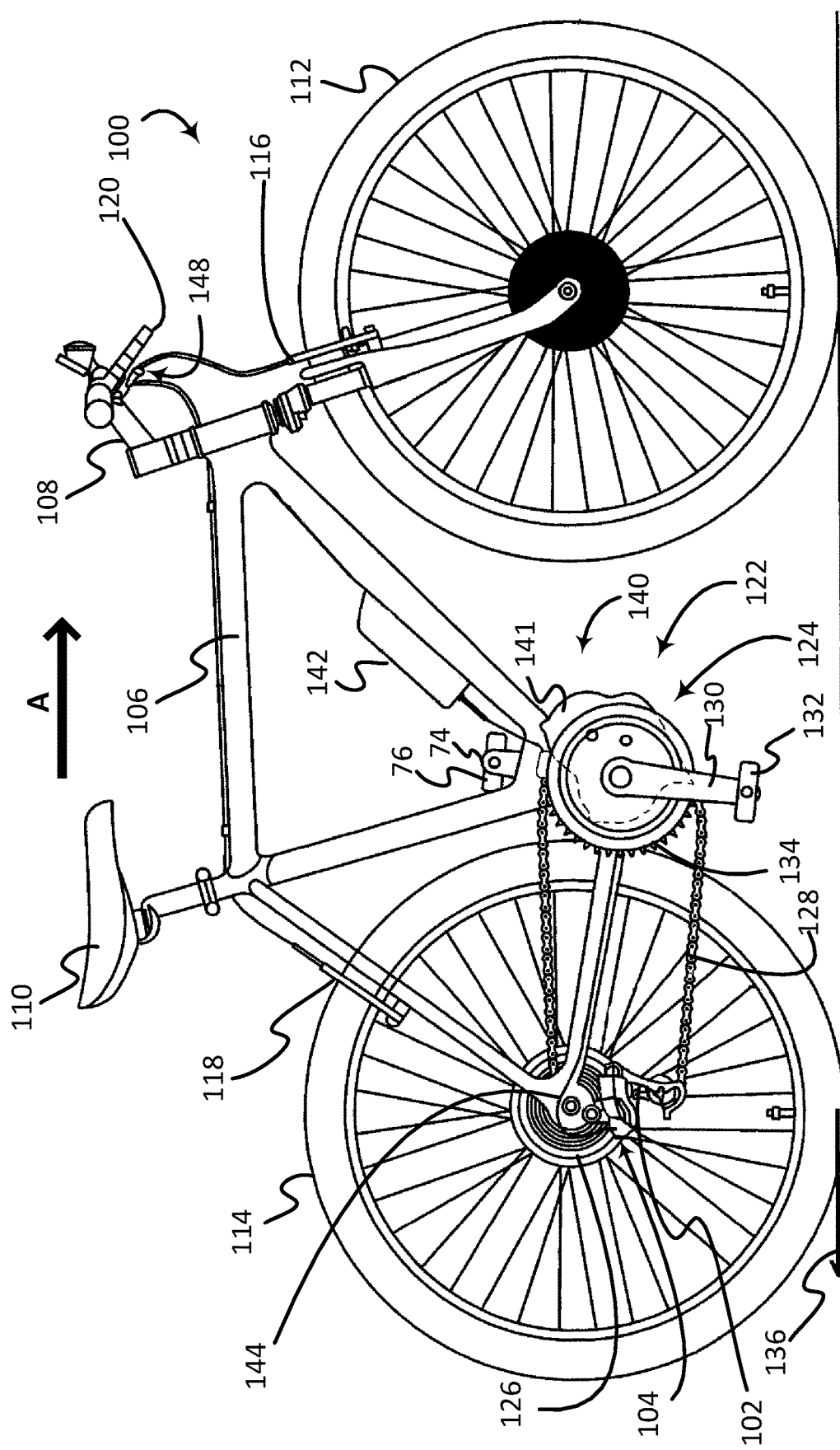
FIG. 1 shows a side view of one example of a bicycle with component motion that may be controlled in accordance with the teachings of this disclosure.

Turning now to the drawings, FIG. 1 illustrates an example bicycle 100 (e.g., e-bike) that may be used to implement a connection to a gear changer 102 using an intermediate power connector 104. In the illustrated embodiment, the bicycle 100 includes a frame 106, handlebars 108, and a seat 110. The bicycle 100 also includes a first or front wheel 112 and a second or rear wheel 114. A front brake 116 and/or a rear brake 118 are included to brake the front wheel 112 and the rear wheel 114, respectively. The front brake 116 and/or the rear brake 118 are controlled by at least one brake actuator 120. The bicycle 100 includes a drive train 122. The drive train 122 of FIG. 1 includes a crank assembly 124 operatively coupled to a rear cassette 126 via a chain 128. The crank assembly includes crank arms 130 and pedals 132, as well as at least one chainring 134 configured to operatively couple with the chain 128 to transmit force and/or power exerted onto the crank assembly 124 to the chain 128. This force and/or power is transmitted to the rear cassette 126 by the chain 128, whereby a motivating force 136 and/or power is transmitted to the rear wheel 114 from the rear cassette 126. While the drive train 122 includes the gear changer (e.g., a rear derailleur 102 in the illustrated embodiment), other transmissions such as an internal gear hub, a gear box, and/or a continuously variable transmission may be applied to the bicycle 100.

The drive train 122 may also include a power assist device 140. Pedaling torque is applied to the crank assembly 124 by a rider using the pedals 132 and crank arms 130. The power assist device 140 is configured to assist the rotation of the rear wheel 114. In the illustrated embodiment, the power assist device 140 is configured to assist the rotation of the wheel rear 114 via a coupled connection to the crank assembly 124. The power assist device 140 includes a power assist motor 141 that is powered by a remote power source 142.

The chain 128 may be moved between individual sprockets of the rear cassette 126 using the gear changer, such as the rear derailleur 102, as shown in FIG. 1. The rear derailleur 102, for example, is an electric gear changer that is controlled by signals indicating that a shift command has been actuated by the bicycle operator, or rider. The electric rear derailleur 102 may be alternatively powered by an integrated power source or a remote power source 142, using a power conductive connector or cable 144. The power is provided from the remote power source 142 through the cable 144 to the intermediate power connector 104 that is coupled to the rear derailleur 102. The shift commands are implemented using an electric actuator 148 that is manually operable by the rider. The signals indicating the shift commands may be communicated to the electric rear derailleur 102 using wired and/or wireless communication techniques.

Figure 2:
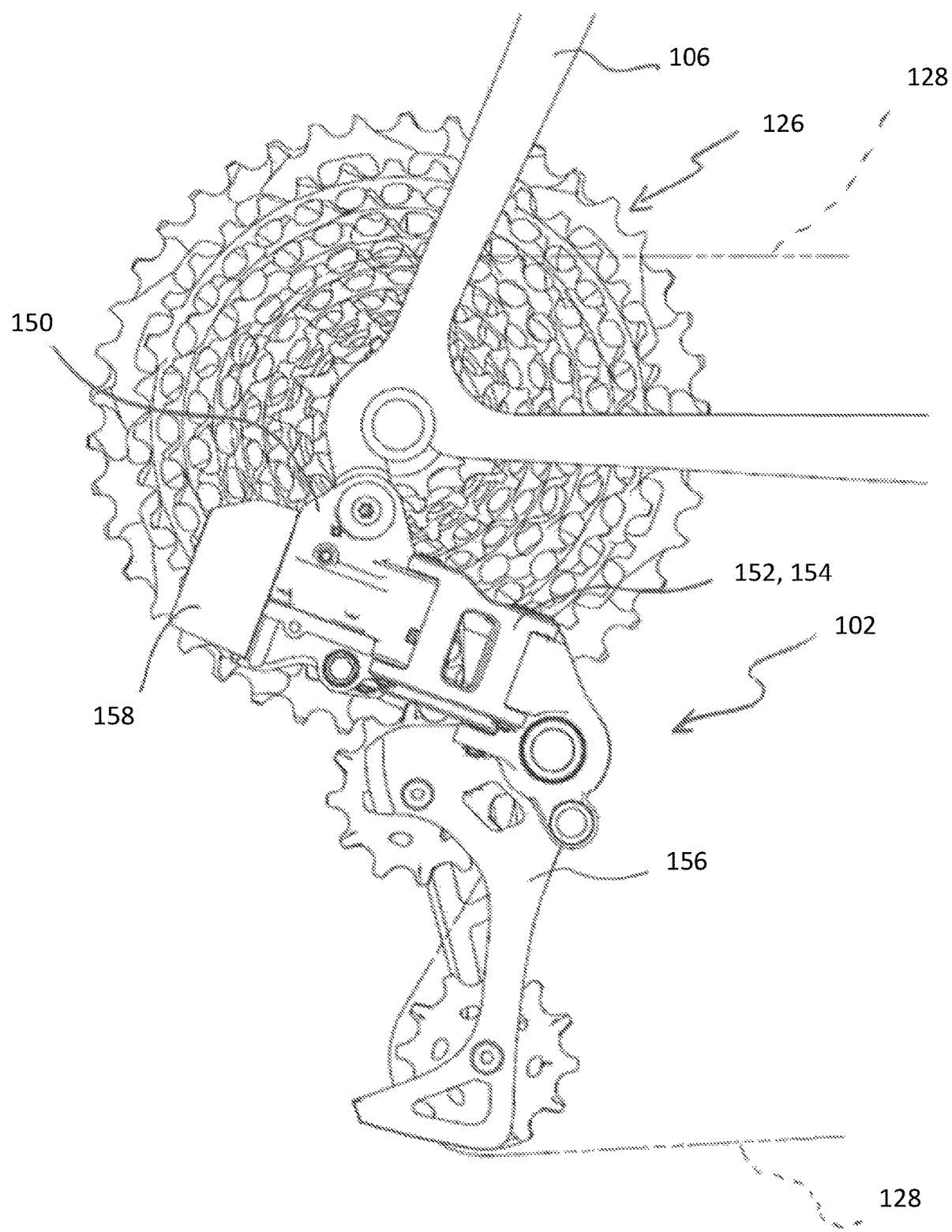
FIG. 2 is a side view of one example of a rear derailleur.

Referring to FIG. 2, the rear derailleur 102 is attached to the bicycle frame 106 and positioned next to the rear cassette 126. The chain 128 is only schematically shown in dashed lines. The electric, or electromechanical, rear derailleur 102 includes a base member 150 (e.g., a "b-knuckle"), an outer link 152, and an inner link 154. The base member 150 is attachable to the bicycle frame 106 in a conventional manner. The inner link 154 is pivotally attached to the base member 150 by link pins, for example. A moveable member or assembly 156 (e.g., a "p-knuckle") is pivotally connected to the outer link 152 and the inner link 154 at an end opposite the base member 150 to permit displacement of the moveable assembly 156 relative to the base member 150.

The rear derailleur 102 may also be configured to work with an integrated power source 158, such as a removable battery. In the examples shown in FIGS. 1 and 2, the integrated power source or battery 158 is attached to the rear derailleur 102. The integrated power source 158 may power, for example, a motor of the rear derailleur 102 used to shift the rear derailleur 102. The intermediate power connector 104 may include an interface with the rear derailleur 102 that includes interface features similar to the removable battery 158 in order to electrically connect to the derailleur 102. This interface may have a portion that is removably connectable or coupleable to the rear derailleur 102. The intermediate power connector 104, or at least a connecting portion thereof, may also be smaller than the removable battery 158. As the intermediate power connector 104 transmits power from the remote battery or power source 142, the intermediate power connector 104 may include circuitry for transforming the electrical energy provided by the remote battery 142 into a form that is usable by the derailleur 102. For example, the intermediate power connector 104 may include circuitry for voltage reduction, voltage rectification, as well as other power transformation circuitry and/or devices or combinations thereof. In an embodiment, the intermediate power connector 104 may also include communication circuitry and/or other devices. For example, the intermediate power connector 104 may include a wireless transmitter and/or receiver, CANbus to wireless translator, wired data connector, a CANbus to derailleur protocol translator, and/or other devices or circuitry and combinations thereof.

As shown, the bicycle 100 also has a handlebar mounted user interface, by way of the shift actuator or electric actuator 148. All of these components may be connected to the remote power source or remote battery 142. Additionally, all the communication between the e-bike central control system or controller, and each component is achieved through wired or wireless communication. There may be discrete control with individual wires from the central controller to each component or the system may use a controller area network ("CAN") bus designed to allow microcontrollers and devices to communicate with each other in applications.

While the illustrated bicycle 100 is a mountain bicycle and may include suspension components, such as a shock absorbing front fork, the embodiments disclosed herein may be implemented with other types of bicycles such as, for example, road bicycles. The front and/or forward orientation of the bicycle 100 is indicated by the direction of the arrow "A" in FIG. 1. As such, a forward direction of movement of the bicycle is indicated by the direction of the arrow A.

An e-bike central control system or controller may be supported by a same housing as the remote power source 142. The e-bike controller may control power from the remote power source 142 to components on the bicycle 100 such as, for example, the power assist device 140. The e-bike controller may control power to other and/or different components on the bicycle 100. The e-bike controller may send signals (e.g., instructions) to and/or receive data (e.g., instructions and/or sensor data) from components on the bicycle 100 such as, for example, the derailleur 102, a suspension system, and/or a seat post assembly to actuate and/or control components of the bicycle 100.

In other embodiments, the e-bike controller may be located in other locations (e.g., mounted on the handlebars) on the bicycle 100 or, alternatively, may be distributed among various components of the bicycle 100, with routing of a communication link to accommodate necessary signal and power paths. The e-bike controller may also be located other than on the bicycle 100, such as, for example, on a rider's wrist or in a jersey pocket. The communication link may include wires, may be wireless, or may be a combination thereof. In one example, the e-bike controller may be integrated with the rear derailleur 102 to communicate control commands between components. The e-bike controller may include a processor, communication device (e.g. a wireless communication device), a memory, and one or more communication interfaces.

In one example, the controller of the derailleur and/or the e-bike controller wirelessly actuates a motor module of the derailleur 102 and/or an assist motor and operates the derailleur 102 for executing gear changes and gear selection. Additionally or alternatively, the controller of the derailleur and/or the e-bike controller may be configured to control gear shifting of a front gear changer.

Figure 3:
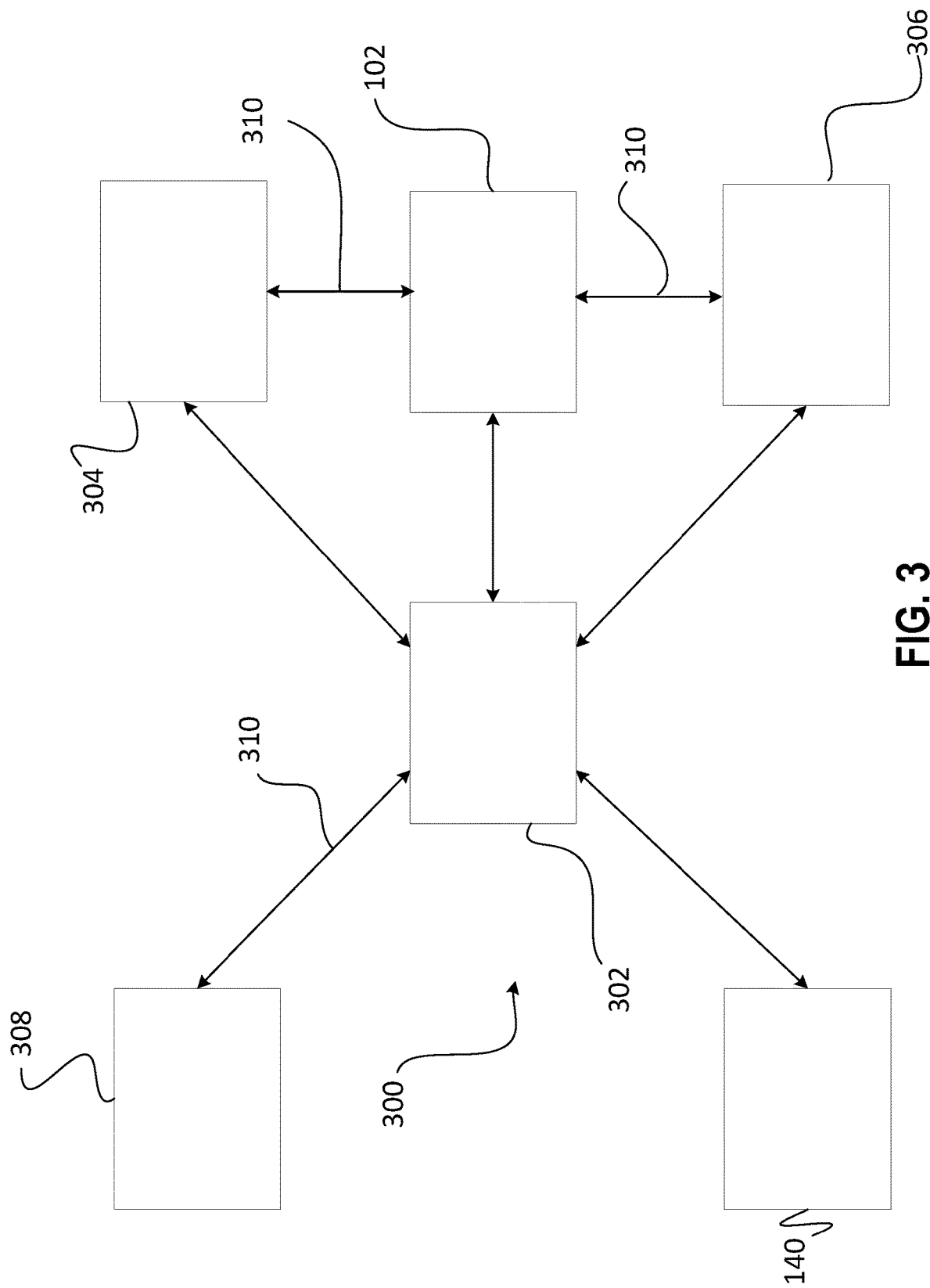
FIG. 3 is a block diagram of an embodiment of an electromechanical control system.

FIG. 3 shows an example of a control system 300 (e.g., an electromechanical control system) for the bicycle 100, for example. The control system 300 includes the e-bike controller 302, the power assist device 140, the rear derailleur 102, and one or more sensors. The power assist device 140 is, for example, an assist motor.

The one or more sensors include, for example, a pedal speed sensor 304, a wheel speed sensor 306, and a torque sensor 308. For example, the pedal speed sensor 304 measures a rotational speed of at least one of the crank arms 130, the wheel speed sensor 306 measures a rotational speed of at least one of the wheels 114, 112, and the torque sensor 308 measures a torque on the crank assembly 124 and/or a torque on an output shaft of the assist motor 140. The control system 300 may include more, fewer, and/or different sensors. For example, the one or more sensors may include more than one wheel speed sensors 306, one for the front wheel 112 and one for the rear wheel 114.

The pedal speed sensor 304, the wheel speed sensor 306, and the torque sensor 308 may be any number of different types of sensors. For example, the pedal speed sensor 304 and the wheel speed sensor 306 may be a combined speed and cadence sensor. The speed and cadence sensor may include a spoke magnet attached to a spoke of the front wheel 112 or the rear wheel 114 and/or a cadence magnet attached to one of the crank arms 130, and a sensor attached to the frame 106 of the bicycle 100 (e.g., a Hall effect sensor). The sensor attached to the frame 106 of the bicycle is configured to identify and count rotations of the one crank arm 130 and/or the front wheel 112 or the rear wheel 114 based on the cadence magnet and/or the spoke magnet passing the sensor attached to the frame 106, respectively. Other types of sensors may be provided (e.g., a combination of a gyroscope and an accelerometer for the wheel speed sensor 306). The torque sensor 308 may include, for example, magnetoelastic torque sensors, strain gauges, SAW devices, and/or other types of torque sensors. In one embodiment, the torque sensor 308 is a current sensor that measures current through the assist motor 140. The amount of current consumed by the assist motor 140 is proportional to a torque the assist motor 140 applies to a drivetrain of the bicycle 100.

As shown in the embodiment of FIG. 3, the power assist device 140, the rear derailleur 102, and the one or more sensors (e.g., the pedal speed sensor 304, the wheel speed sensor 306, and the torque sensor 308) may be in direct communication with the e-bike controller 302. Alternatively or additionally, at least some components of the control system 300 may be in indirect communication with the e-bike controller 302. For example, the wheel speed sensor 306 and/or the pedal speed sensor 304 may be in direct communication with the rear derailleur 102 and indirect communication with the with the e-bike controller 302 via the rear derailleur 102. In one embodiment, each of at least the rear derailleur 102 and the e-bike controller 302 is in direct communication with all sensors of, for example, the pedal speed sensor 304, the wheel speed sensor 306, and the torque sensor 308. Other and/or different components of the control system 300 may be in direct communication with all sensors of the one or more sensors (e.g., the power assist device 140). Communication between the components of the control system 300 may be wired communication and/or wireless communication.

Each communication link 310 between the components of the control system 300 may be in both directions. In other words, data flow between components of the control system 300 in direct communication may be in both directions. For example, the wheel speed sensor 306 may receive signals from the e-bike controller 302 or the rear derailleur 102 (e.g., as to when to measure the rotational speed) and return the measured rotational speed to the e-bike controller 302 or the rear derailleur 102.

Figure 4:
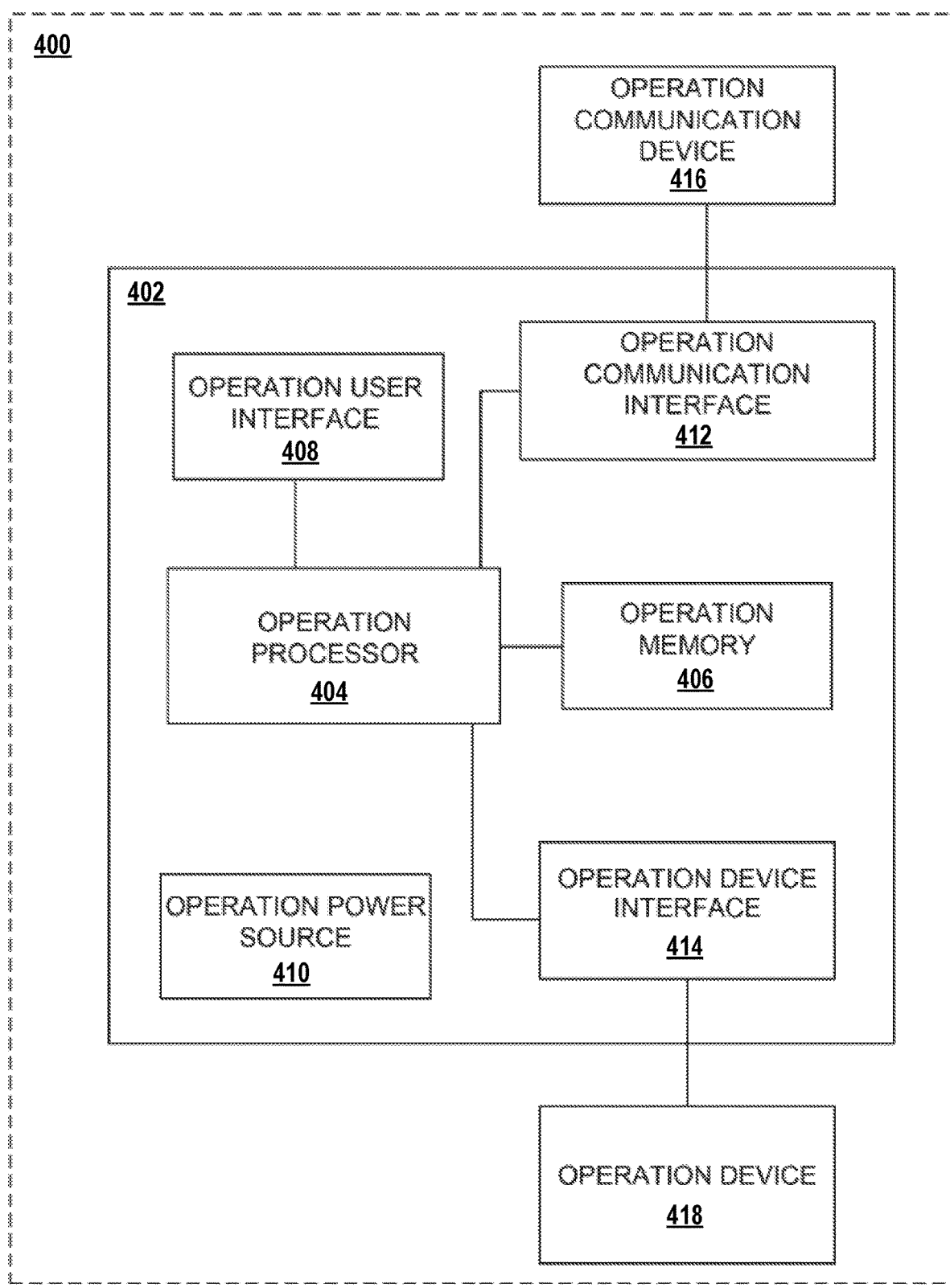
FIG. 4 is a block diagram of an operation component.

FIG. 4 is a block diagram of an operation component 400. The operation component 400 may be or may be part of one or more of the previously described components such as, for example, the rear derailleur 102, the e-bike controller 302, and a front gear changer. The operation component 400 may also be another component, such as the power assist device 140, an internal gearbox component, a suspension or an adjustable suspension component, or an adjustable seating component. A plurality of operation components 400 may be provided.

The operation component 400 is provided with an operation unit 402, which may be a circuit board or an alternative configuration. The operation unit 402 includes an operation processor 404, an operation memory 406, an operation user interface 408, an operation power source 410, an operation communication interface 412, and an operation device interface 414. In an embodiment, the operation communication interface 412 is in communication with an operation communication device 416 and the operation device interface 414 is in communication with an operation device 418. Additional, different, or fewer components may be provided. For example, the operation user interface 408 may be omitted.

The structure, connections, and functions of the operation processor 404 may be representative of those of the rear derailleur 102, the front derailleur, the ebike controller 302, or another component. The operation processor 404 may include a general processor, digital signal processor, an ASIC, FPGA, analog circuit, digital circuit, combinations thereof, or other now known or later developed processor. The operation processor 404 may be a single device or combinations of devices, such as through shared or parallel processing.

The operation memory 406 may be a volatile memory or a non-volatile memory. The operation memory 406 may include one or more of a ROM, a RAM, a flash memory, an EEPROM, or other type of memory. The operation memory 406 may be removable from the operation component 400, such as an SD memory card. In a particular non-limiting, exemplary embodiment, a computer-readable medium can include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The operation memory 406 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

The operation power source 410 is a portable power source, which may be stored internal to the operation component 400 or stored external to the operation component 400 and communicated to the operation component through a power conductive cable. The operation power source 410 may involve the generation of electric power, for example using a mechanical power generator, a fuel cell device, photo-voltaic cells, piezoelectric, or other power-generating devices. The operation power source 410 may include a battery such as a device consisting of two or more electrochemical cells that convert stored chemical energy into electrical energy. The operation power source 410 may include a combination of multiple batteries or other power providing devices. Specially fitted or configured battery types, or standard battery types may be used.

In the example where the operation component 400 is the rear derailleur 102, the operation power source 410 may be stored internal to the operational component 400. In the example where the operation component 400 is the e-bike controller 302, the operation power source 410 may be stored internal or external to the operation component 400. For example, the e-bike controller 302 may be supported within a housing of the remote power source 142 of FIG. 1.

The operation device interface 414 provides for operation of a component of the bicycle 100. For example, the operation device interface 414 may transmit power from the operation power source 410 to generate movement in the operation device 418. In various embodiments, the operation device interface 414 sends power to control movement of the assist motor 140, a motor of the rear derailleur 102, a motor of the front derailleur, or any combination thereof. In one embodiment, the operation component 400 is the e-bike controller 302, and the operation device interface 414 sends power to control movement of the power assist device 140. The operation device interface 414 includes wired conductive signals and/or data communication circuitry operable to control the operation device 418.

The operation user interface 408 may be one or more buttons, keypad, keyboard, mouse, stylus pen, trackball, rocker switch, touch pad, voice recognition circuit, or other device or component for communicating data between a user and the operation component 400. The operation user interface 408 may be a touch screen, which may be capacitive or resistive. The operation user interface 408 may include an LCD panel, LED, LED screen, TFT screen, or another type of display. The operation user interface 408 may also include audio capabilities or speakers.

The operation communication interface 412 is configured to receive, with the operation communication device 416, data such as measurement data (e.g., rotational crank speed, rotational wheel speed, and/or torque), anticipation signals, operation signals, and/or other signals from bicycle components (e.g., the pedal speed sensor 304, the wheel speed sensor 306, and/or the torque sensor 308; the e-bike controller 302). In one embodiment, the operation component 400 includes more than one operation communication interface 412 in communication with more than one operation communication device 416, respectively. The operation communication interface 412 may also be configured to send data such as status signals (e.g., temperature sensor signals) for reception by, for example, the e-bike controller 302. The operation communication interface 412 communicates the data using any operable connection. An operable connection may be one in which signals, physical communications, and/or logical communications may be sent and/or received. An operable connection may include a physical interface, an electrical interface, and/or a data interface. One or more operation communication interfaces may provide for wireless communications through the operation communication device 416 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as components of the control system 300 (e.g., the e-bike controller 302 and the rear derailleur 102), and/or other components on the bicycle 100 and/or worn by the user. Further, in an exemplary, non-limited embodiment, implementations may include distributed processing, component/object distributed processing, and parallel processing. Alternatively, virtual computer system processing can be constructed to implement one or more of the methods or functionality as described herein.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and the apparatus may also be implemented as, special purpose logic circuitry (e.g., an FPGA or an ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data (e.g., magnetic, magneto optical disks, or optical disks). However, a computer need not have such devices. Moreover, a computer may be embedded in another device such as, for example, a mobile telephone, a personal digital assistant ("PDA"), a mobile audio player, a Global Positioning System ("GPS") receiver, a control unit, a rear derailleur, or a front gear changer, to name just a few. Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory may be supplemented by, or incorporated in, special purpose logic circuitry.

The operation communication device 416 provides for data and/or signal communication from the operation component 400 to another component of the bicycle 100, or an external device such as a mobile phone or other computing device. The operation communication device communicates the data using any operable connection. An operable connection may be one in which signals, physical communications, and/or logical communications may be sent and/or received. An operable connection may include a physical interface, an electrical interface, and/or a data interface. The control communication device may be configured to communicate wirelessly, and as such include one or more antennae. The control communication device provides for wireless communications in any now known or later developed format.

A control antenna may also be provided. The control antenna may be a plurality of control antennae. The operation component 400 may include an antenna with circuitry of a PCB of the operation component 400; however, additional antennae may also be included in the circuitry. The control antenna may be integrated with another component of the bicycle 100 or may be an independent component. For example, the control antenna may be integrated as part of the e-bike controller 300 and/or as part of the rear derailleur 102.

The derailleur 102 may allow configuration of a number of ride modes that may be switched between by a control unit (e.g., the e-bike controller 302 or another controller on or outside of the bicycle 100). The control unit may switch the ride mode based on user input (e.g., via the electric actuator 148 or another interface) or automatically based on sensed conditions. In each mode, various characteristics of the ride mode may be adjusted. For example, gear hysteresis, minimum gear to shift to without pedaling, and/or other characteristics may be adjusted.

Figure 5:
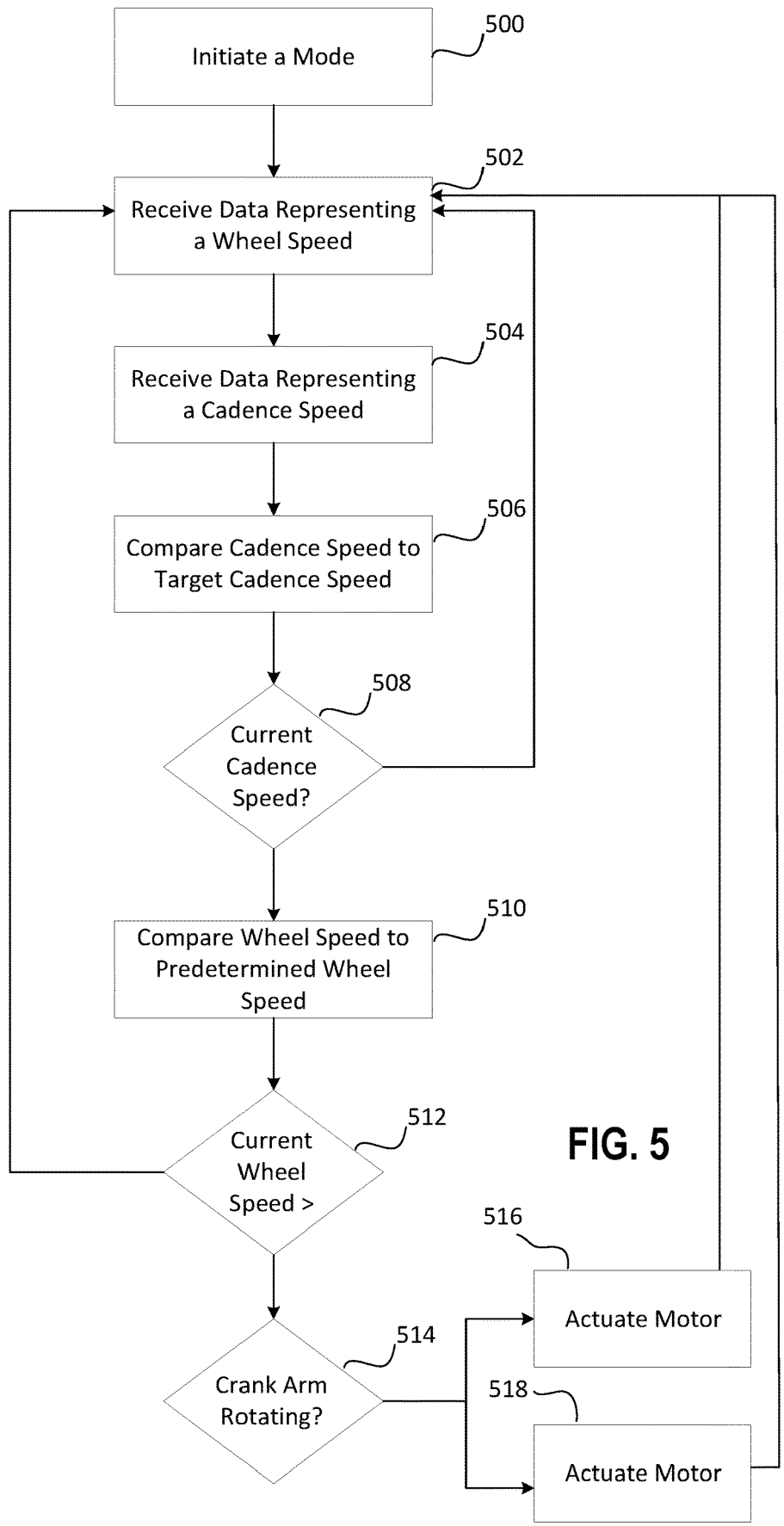
FIG. 5 is a flowchart of an embodiment of a method for automatic shifting.

FIG. 5 is a flowchart of an embodiment of a method for electromechanical control of components of the bicycle 100, for example. The flowchart also illustrates a method for transmitting and receiving wireless signals on the bicycle 100. As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 102, the e-bike controller 302, the power assist device 140, the one or more sensors, or any combination thereof. Additional, different, or fewer acts may be provided. The acts are performed in the order shown or in other orders. The acts may be repeated.

In act 500, a processor initiates a mode (e.g., a full automatic mode) for a bicycle. In the full automatic mode, a derailleur (e.g., the derailleur 102) is shifted without user input to maintain a gear that results in a rider cadence close to a defined target based on a current wheel speed. The processor may initiate the full automatic mode based on user input or automatically based on sensed riding conditions. In one embodiment, the processor is a processor of the derailleur and initiates the full automatic mode based on instructions from another processor that received the user input or identified the sensed riding conditions (e.g., the e-bike controller 302).

In act 502, the processor receives data representing a wheel speed from a sensor (e.g., a wheel speed sensor; the wheel speed sensor 306). The wheel speed sensor measures rotational speed of a wheel continuously or at a predetermined interval. The received data representing the wheel speed may be for a front wheel of the bicycle and/or a rear wheel of the bicycle. The data representing the wheel speed may be a rotational speed value (e.g., in revolutions per minute).

In act 504, the processor receives data representing a cadence speed from a sensor (e.g., a pedal speed sensor or crank cadence sensor; the pedal speed sensor 304). The pedal speed sensor measures rotational speed of a crank arm, to which a pedal of the bicycle is attached, continuously or at a predetermined interval. The data representing the cadence speed may be a rotational speed value (e.g., in revolutions per minute).

Some wheel speed and crank cadence sensors that may be used for inputs to the method use a single magnet mounted on the wheel or crank, respectively, and a single reed switch or hall effect sensor mounted to the frame. As the wheel or crank rotates, the magnet passes by the Hall effect sensor or the reed switch once per revolution, generating a signal that is read by the processor. These sensor systems measure crank or wheel angular velocity using a time between activations of the reed switch or the Hall effect sensor. As a wheel or a crank decelerates, a time period between hall or reed events increases. The rotational speed calculated by the microprocessor is only updated when a sensor event occurs. The automatic shifting performance of the method described above increases the faster the current wheel or the current crank speed may be accurately updated. When the wheel or the crank comes to a complete stop, the magnet does not pass by the Hall effect sensor or the reed switch again, so the time to update the speed becomes infinite. To prevent this, the processor has a maximum time between activations, beyond which the crank speed or the wheel speed is assumed to be 0 (e.g., greater than 2 seconds, effectively stopped). If the rider has decelerated from 60 RPM to 0 RPM within 1 revolution of the wheel, the processor would have to wait two seconds to make that determination If the method makes a critical decision after the wheel speed has dropped below 50 RPM, the processor may estimate when this has occurred by tracking how much time has elapsed since the last sensor event. It may be assumed that the bicycle is not traveling faster than $$\frac{60 \text{ seconds}}{\text{seconds elapsed since last event}} (\text{RPM}).$$

Using this calculation allows the bicycle (e.g., the processor) to act faster on crank speed and/or wheel speed information than waiting for the next signal to occur.

In act 506, the processor compares the data representing the cadence speed (e.g., current cadence speed) received in act 504 to a target cadence speed. The target cadence speed may be user defined. For example, the bicycle may include one or more control devices (e.g., two control buttons) mounted on the handlebars of the bicycle. The two control buttons may be in communication (e.g., wireless communication and/or wired communication) with, for example, the e-bike controller 302 and/or other components on the bicycle. One of the two control buttons may generate a signal instructing an increase in the target cadence speed when pressed, and the other of the two control buttons may generate a signal instructing a decrease in the target cadence speed when pressed. A single press of either of the two control buttons, for example, increments or decrements the target cadence speed (e.g., a setpoint) by a configurable number of RPM. In one embodiment, the setpoint is adjustable within functionally practical predetermined bounds (e.g., 60 RPMs-120 RPMs). The rider attempting to adjust beyond the limits of the predetermined bounds has no effect on the setpoint. In other words, the setpoint will remain at the lower bound or the higher bound. The predetermined bounds may also be adjustable.

In one embodiment, shifter buttons that control the rear derailleur upshift and downshift actions may be dual purposed to control the setpoint of the automatic shifting target cadence. The upshift and downshift buttons may trigger the upshift and downshift actions of the rear derailleur, respectively, if the shifter button is pressed for less than a predetermined amount of time (e.g., less than 300 milliseconds). If a shifter button is pressed and held for longer than the predetermined amount of time (e.g., a long press), the long press may be considered a setpoint adjustment command and may increment or decrement the target cadence.

Each setpoint adjustment may only modify the target cadence by a small amount (e.g., 1 RPM) to achieve a precise adjustment. In one embodiment, in order to make a large adjustment to the target cadence quickly, a long press may be followed by one or more shorter presses (e.g., less than 300 milliseconds). As long as each shorter press occurs within some threshold time after the previous press (e.g., 800 milliseconds), the shorter presses may each cause an additional increment or decrement to the setpoint.

During a sequence of presses, if a time between a button press and the previous button press exceeds a threshold period of time, the button press, and all subsequent presses may be interpreted as a derailleur upshift or downshift commands until another long press occurs. If a long press is followed by one or more of short presses within the threshold to be considered a repeated command, but the button direction changes (e.g., LONG UP, SHORT UP, SHORT UP, SHORT DOWN), the repeated command sequence may be terminated, and the button press of the alternate direction may be interpreted as a shift. The downshift button may share the increase setpoint function, and the upshift button may share the decrease setpoint function. In one embodiment, these function pairings may be swapped A memory in communication with the processor (e.g., a memory of the derailleur 102 or a memory of the e-bike controller 302) stores a gear ratio table and upshift/downshift tables. When the setpoint is adjusted by the rider, the processor recalculates the gear ratio table and the upshift/downshift tables based on the adjusted setpoint. If a closest gear ratio changes at the time of the setpoint adjustment, the derailleur immediately shifts, ignoring hysteresis built into the upshift/downshift tables.

In one embodiment, the setpoint adjustment is configured through a system control interface (e.g., an e-bike system control interface). The system control interface may be capable of displaying a current setpoint and directly adjusting the setpoint on the rear derailleur. In another embodiment, the setpoint adjustment is executed via a mobile device application in direct communication with the rear derailleur.

In act 508, the processor determines whether the current cadence speed received in act 504 is within a range (e.g., within 3 RPMs) relative to the target cadence speed based on the comparison of act 506. If the current cadence speed is within the range, the method returns to act 502. If the current cadence speed is outside of the range, the method moves to act 510.

In act 510, the processor compares the current wheel speed to a predetermined minimum wheel speed. For example, the processor calculates a difference between the current wheel speed and the predetermined minimum wheel speed. The predetermined minimum wheel speed represents, for example, a functional minimum rotational wheel speed.

In act 512, the processor determines whether the current wheel speed is greater than or less than the predetermined minimum wheel speed based on the comparison in act 510. If the processor determines the current wheel speed is less than the predetermined minimum wheel speed, a shift is not initiated, and the method returns to act 502. If the processor determines the current wheel speed is greater than the predetermined minimum wheel speed, the method moves to act 514.

The feature of overdriving chainring while not pedaling is limited by speed of bicycle. This provides that the chainring is not to be driven at a speed such that torque is applied to the wheel. Because of this, the method described above may not be applied when the bicycle is moving very slowly or is stopped. To overcome this, a hub capable of decoupling the cassette may be used. When the bicycle is stopped or moving below a speed at which the overdrive function may be safely used, the control system may decouple or declutch the cassette from the rear hub to allow forward motion of the cassette without applying torque to the wheel. With the hub decoupled, the derailleur may change gears, and the assist motor may run in overdrive to select a desirable gear for the slow or stopped condition. The crank speed sensor may be used to detect resumed rider input into the system. The control system recouples the cassette to the hub when rider pedaling or faster rider pedaling is detected.

In act 514, the processor determines whether the crank arm is rotating. For example, the processor determines whether the crank arm is rotating based on the current cadence speed received at act 504. If the current cadence speed is greater than zero, the method moves to act 516. If the current cadence speed is equal to zero or approximately zero (e.g., less than or equal to 1 RPMs), the method moves to act 518.

In act 516, the processor instructs a motor (e.g., a motor of the derailleur or the assist motor 140) to actuate and shift to maintain a gear that results in a rider cadence close to (e.g., within the range discussed above) the target cadence speed identified in act 506. After act 516, the method returns to act 502.

When performing automatic shifts, the derailleur may adjust a minimum timing between shifts based on current wheel speed, current cog, current rider cadence, or some other parameter to provide that each shift is completed before a next shift is attempted. This timing is optimized to allow shifting as fast as possible without inducing a shift failure.

The assist motor is to not run without the user pedaling such that the motor is accelerating or maintaining the bicycle speed. This is not difficult if the current wheel speed is accurate. The wheel speed sensor may, however, update the current wheel speed only once per revolution of the wheel. During rapid deceleration events, the bicycle may drop below a speed of the assist motor before the wheel speed sensor has reported the speed change. An accelerometer or inertial measurement unit (IMU) of the bicycle may be used to supplement the wheel speed sensor data by disabling the assist motor in the event of a significant deceleration. If a rapid deceleration event occurs, the assist motor may be temporarily stopped (e.g., if currently running) until wheel speed data has been updated.

In act 518, the processor instructs, for example, the assist motor to run for a period of time to allow the chain to derail to a target cog (e.g., with the motor of the derailleur). After act 516, the method returns to act 502.

When using the assist motor to facilitate shifting while the rider is not pedaling, the assist motor should be running the drivetrain slower than the bicycle is moving. A threshold for an amount of current consumed by the assist motor (e.g., proportional to the torque the assist motor is applying to the drivetrain) may be defined to prevent the motor from unwanted power input into the drivetrain. This is an intentionally redundant method of shutting down the assist motor to the speed calculation. It is important that the assist motor not apply unexpected torque to the drivetrain, causing unexpected acceleration of the bicycle.

A rate at which the assist motor, for example, drives the chain to facilitate shifting while the rider is not pedaling is to be low enough such that for a current gear ratio and the current wheel speed, no torque is transmitted to driving elements of a hub (e.g., chainring_rpm<current_gear_ratio*current_wheel_speed+ safety_margin). It is desirable to complete the shift as fast as possible. Accordingly, the chainring may be driven as fast as possible without applying torque to, for example, the rear wheel. The assist motor speed may therefore be set as a function of the current gear ratio and the current wheel speed. In an embodiment, the motor output torque is limited below a threshold during a motor aided shifting event. For example, the motor output torque may be limited to two ("2") newton-meters ("N m").

It is desirable that the assist motor run for as little time as is needed to complete the commanded shift. Any time the chainring is turning the opportunity for a chainring derailment is increased (e.g., with the low pedaling loads of the motor assisted shift). The duration that the motor runs may be a function of the currently selected cog, as different cogs have different expected times to complete shift. In one embodiment the rear derailleur (e.g., the processor and/or one or more sensors of the rear derailleur) may determine when the shift has been completed (e.g., the chain has derailed to the target cog). In this case, the motor may run until the derailleur has detected the completion of the shift.

In one embodiment, the automatic shifting described above may operate with the motor drive function while not pedaling (e.g., overdriving the chainring while not pedaling) even if the bicycle is configured for zero rider assistance. In this configuration, the assist motor may only run when the derailleur is shifting and not pedaling to facilitate shifting. When the rider is pedaling, the non-assisting mode of the e-bike system is honored.

Figure 6:
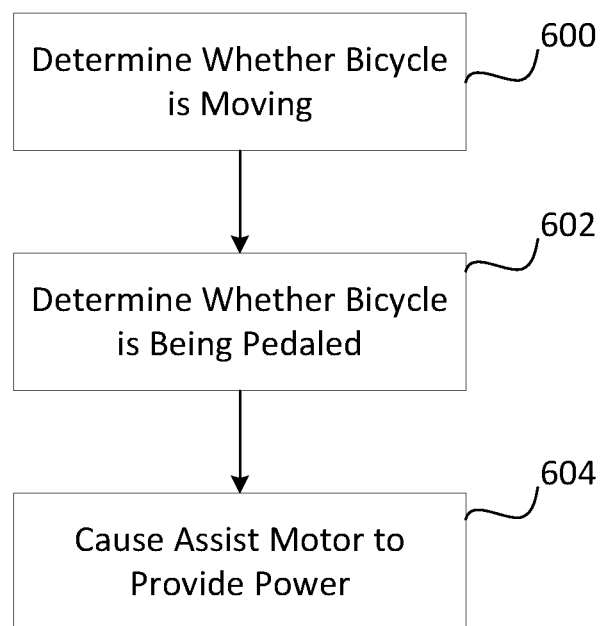
FIG. 6 is a flowchart of an embodiment of a method for controlling one or more components of a bicycle.

FIG. 6 is a flowchart of an embodiment of a method for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

In act 600, a processor determines whether the bicycle is moving. In one embodiment, the processor determines whether the bicycle is moving by receiving wheel speed data from a wheel speed sensor of the bicycle and determining whether the bicycle is moving based on the received wheel speed data. For example, the processor may determine the bicycle is moving when the received wheel speed data indicates a wheel speed is greater than zero.

In act 602, when the bicycle is determined to be moving, the processor determines whether the bicycle is being pedaled. In one embodiment, the processor determines whether the bicycle is being pedaled by receiving crank data from one or more crank sensors of the bicycle and determining whether the bicycle is being pedaled based on the received crank data. For example, the processor may determine the bicycle is being pedaled when the received crank data indicates a crank speed is greater than zero.

The one or more crank sensors of the bicycle may include any number of different types of crank sensors. For example, the processor may receive crank cadence data from one or more cadence sensors of the bicycle, crank angular position data from one or more angular position sensors of the bicycle, crank angular velocity data from one or more angular velocity sensors of the bicycle, or any combination thereof.

In one embodiment, when the bicycle is determined as being pedaled, the method may include additional acts. For example, the processor may estimate, continuously or at a predetermined interval, an angular position of the crank arm based on the received crank data.

In act 604, when the bicycle is determined to be free of pedaling, the processor causes an assist motor of the bicycle to provide power to a drive train of the bicycle for the electronic shifting of the bicycle. In one embodiment, the processor causes the assist motor of the bicycle to provide power to the drive train of the bicycle for a period of time such that a single gear is shifted. If a number of gears are to be shifted, the assist motor may be activated a number of different times.

Derailleur actions may be timed and/or otherwise correlated with angular position of the crank arm. In other words, derailleur shift operations may be timed to act with particular angular positions of the crank arm. The processor may execute the shifting based on the estimated angular position of the crank. For example, the processor causes the assist motor of the bicycle to provide power to the drive train of the bicycle for the electronic shifting of the bicycle when the estimated angular position of the crank arm matches a predetermined angular position of the crank arm. In one embodiment, the predetermined angular position of the crank arm corresponds to a vertical position of the crank arm.

When a rear shifting system executes a shift, the rider may experience a discontinuity in their pedaling stroke, such as a short but fast crank advancement which may be disturbing or cause an unpleasant feeling for the rider. Also, in some rear shifting systems it is desirable that the chain tension be low during shifting to prevent damage to a cassette, chain, or gearbox. Because the rider cannot anticipate when the automatic shifting algorithm will execute a shift and adjust their pedaling force accordingly during the shift, it is beneficial to both the rider and the shifting mechanism that the shifts occur when the rider's input torque is low. As a rider pedals there are typically regions of low torque input, such as when the cranks are in the vertical position. A crank cadence, angular position, or angular velocity sensor may be used to delay, and/or otherwise time, the start of the shifting motion in order to cause the shift to execute in a desirable crank arm location for appropriate rider input torque. Some sensors, such as a traditional cadence sensor, may reference a fixed location on the bicycle frame to time crank rotating speed. A signal may be sent from the cadence sensor as is passes the frame reference. When the rear derailleur chooses to execute a shift from the automatic shifting algorithm—it will wait until the cranks are in a position such that the shift will complete at a desirable location in the rider's pedaling motion. The derailleur uses the cadence sensor frame reference signal along with the crank cadence data to maintain an estimated position of the cranks at all times. In an embodiment, the frame mounted portion of a cadence sensor may be positioned relative to an appropriate shift zone for the crank arm position. For example, the frame mounted part of a cadence sensor may be mounted to a seat stay portion of the frame, and another portion of the cadence sensor may be mounted to a crank arm. As such, the shift zone may be initiated upon sensing of the crank arm portion of the sensor, as this orientation may provide indication that the crank arms have reached optimal shifting position when sensed.

The determining of whether the bicycle is moving, the determining of whether the bicycle is being pedaled, and the causing of the assist motor of the bicycle to provide power to the drive train of the bicycle for the electronic shifting of the bicycle may be part of a mode of operation of the bicycle. The processor may initiate the mode of operation of the bicycle based on, for example, sensor data (e.g., when the bicycle is determined to be moving and free of pedaling) and/or user input (e.g., interaction with one or more buttons at the handlebars).

In one embodiment, when in full automatic mode, the rider may still command a shift from a control device (e.g., a shifter). When a rider commanded shift occurs, the automatic shifting functions described above are disabled for a configurable period of time to allow the rider to negotiate a section of riding that necessitated manual override. If the rider commands a shift while not pedaling, the assist motor (e.g., the assist motor 140) may activate to facilitate completion of the shift.

In one variant of the full automatic mode, an automatic only if coasting mode, may be initiated by the processor automatically or in response to user input. In the automatic only if coasting mode, the automatic shifting discussed above only runs if the rider is not pedaling. This may be desirable to a rider riding aggressively so that the rider does not experience shock through the pedals of the bicycle resulting from a shift under a high load. While coasting, the derailleur shifts through gears to match changing wheel speed so that when the rider resumes pedaling, the rider is in a desirable gear.

In another mode, the motoshift only mode, the derailleur is only shifting gears in response to user input (e.g., commands) at, for example, the control device. If the rider commands a shift while not pedaling, the assist motor may activate to facilitate completion of the shift.

The full automatic mode, the automatic only if coasting mode, and the motoshift only mode may also work with a cable actuated derailleur that is controlled by a motorized cable pulling device. Motor assisted shifting while not pedaling may be triggered by a non-electronically actuated shifting system that is able to communicate the shifting event to the e-bike system.

There are a number of operational states of a bicycle in which it is undesirable for the bicycle to attempt automatic shifting. For example, it is undesirable for the bicycle to attempt automatic shifting when the bicycle is being serviced in a stand, when the bicycle is laying on a side, when a user is walking alongside the bicycle, and when the bicycle is at rest. Preconditions for shifting may thus be provided.

For the safety of the user, running a motor (e.g., the assist motor) to complete a shift when the rider is not pedaling may only occur if the bicycle is being ridden. If the bicycle is in a maintenance stand or being pushed/transported by hand, the automatic shifting function should not execute, so that a body part or piece of clothing is not caught in the drivetrain or wheel spokes. During maintenance, a mechanic may turn the cranks and shift the derailleur to make adjustments or diagnose issues. The spinning wheel and crank may trigger the automatic shifting (e.g., with the assist motor).

Any time the bicycle stops moving (e.g., wheel speed<=0), the automatic shifting with the assist motor may also be disabled. Any time the bicycle starts moving, the automatic shifting with the assist motor remains disabled until the rider is detected. Automatic shifting does not constitute a risk to the rider and may always be enabled, regardless of whether the bicycle is being ridden, maintained, or transported; however, a specific implementation of automatic shifting may disable the automatic shifting (e.g., with or without the assist motor) until the rider detection algorithm is satisfied.

After the bicycle starts moving, the processor begins recording crank speed and rider input torque at the cranks. The processor may continuously buffer crank torque and speed data for a rolling time period representing an immediate history of the drivetrain and determine an average power currently being input into the bike. In one embodiment, the time period this buffered data represents is 1 to 5 seconds. Other time periods may be used.

The processor continuously calculates the rider input power (e.g., torque multiplied by speed) averaged over this time period. If the bicycle is in a maintenance stand, the rear wheel of the bicycle is unable to react to any large torque input from the cranks, so a maximum average power over a number of seconds is very low, only coming from an inertia of the rear wheel and frictions in the drivetrain system. When a bicycle is being ridden, the rear wheel will react to torque from the cranks as the bicycle is pedaled at a rate many times that when pedaled in a maintenance stand. The current average power input to the cranks may be compared to a threshold power level that may only be achieved by a bicycle being normally ridden.

Once the average power has exceeded the threshold level, the automatic shifting with the assist motor may be enabled. A bicycle may come to a stop as the rider dismounts the bike, so once the input power requirement is satisfied, the automatic shifting with the assist motor may safely remain enabled until the bicycle wheel speed is zero. When a rider comes to a stop, the automatic shifting with the assist motor is disabled; if the rider resumes riding from a stop, the average input power requirement is to be satisfied again. Typically, when pedaling a bike from a stopped position, a large power input is required to accelerate the bike, such that the requirements discussed above may be quickly satisfied. The time period over which the crank torque and crank speed are recorded may be long enough to prevent false detections but short enough to enable the automatic shifting with the assist motor as quickly as possible.

As discussed above, both wheels may include at least parts of wheel speed sensors (e.g., wheel speed sensors 306). If the wheel speed sensors do not report a same or similar speed (e.g., within 0.1 RPM), this is a strong indication that the bicycle is being pedaled in a stand and the method described above should not shift the derailleur or command the motor to overdrive. There may be exceptions to this if the method described above is being evaluated in a stand. To accommodate this, the control system (e.g., the control system 300) may be put into an override mode to allow cruise control to run, even if the control system believes the bicycle is in a work stand. This override mode may be enabled through the e-bike interface, a mode selecting unit of the drivetrain, a mobile device application, or a button interaction with the derailleur.

Figure 7:
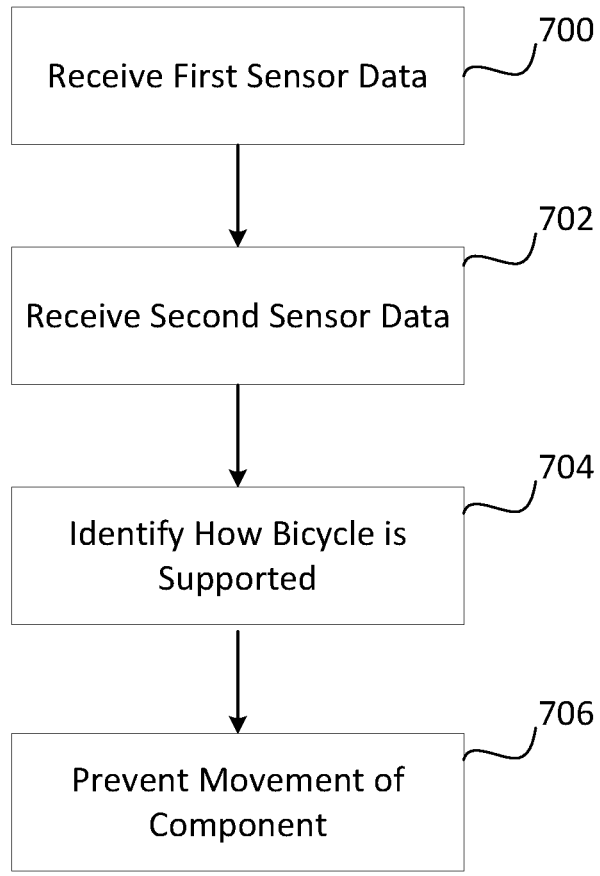
FIG. 7 is a flowchart of another embodiment of a method for controlling one or more components of a bicycle.

FIG. 7 is a flowchart of another embodiment of a method for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

In act 700, a processor receives first sensor data from a first sensor of the bicycle. For example, receiving the first sensor data from the first sensor includes receiving first wheel speed data from a first wheel speed sensor (e.g., a front wheel speed sensor). The first wheel speed data represents a wheel speed of a first wheel (e.g., the front wheel) of the bicycle.

In one embodiment, receiving the first sensor data from the first sensor includes one of receiving bicycle orientation data from an orientation sensor of the electric bicycle, receiving first wheel speed data from a first wheel speed sensor of the electric bicycle, receiving second wheel speed data from a second wheel speed sensor of the electric bicycle, receiving crank speed data from a cadence sensor of the electric bicycle, receiving strain data from a strain gauge of the electric bicycle, and receiving acceleration data from an accelerometer, a gyroscope, or a combination thereof. In another example, receiving the first sensor data from the first sensor includes receiving strain data from a strain gauge of a crank arm, a frame, a handlebar, or a seat of the electric bicycle.

In act 702, the processor receives second sensor data from a second sensor of the bicycle. For example, receiving the second sensor data from the second sensor includes receiving second wheel speed data from a second wheel speed sensor (e.g., a back wheel speed sensor). The second wheel speed data represents a wheel speed of a second wheel (e.g., the back wheel) of the bicycle.

In one embodiment, receiving the second sensor data from the second sensor comprises another of receiving bicycle orientation data from an orientation sensor of the electric bicycle, receiving first wheel speed data from a first wheel speed sensor of the electric bicycle, receiving second wheel speed data from a second wheel speed sensor of the electric bicycle, receiving crank speed data from a cadence sensor of the electric bicycle, receiving strain data from a strain gauge of the electric bicycle, and receiving acceleration data from an accelerometer, a gyroscope, or a combination thereof. For example, receiving the second sensor data from the second sensor includes receiving first wheel speed data from a first wheel speed sensor of the electric bicycle or receiving second wheel speed data from a second wheel speed sensor of the electric bicycle.

In act 704, the processor identifies, based on the first sensor data and the second sensor data, whether the bicycle is supported, such that a wheel of the bicycle is drivable without translation of the bicycle (e.g., the bicycle is supported off of the ground, such as by a stand; a rider engagement status). In one embodiment, the identifying of whether the bicycle is supported in such a way includes comparing, by the processor, the first wheel speed to the second wheel speed. For example, the processor may compare the first wheel speed to the second wheel speed by calculating a difference between the first wheel speed and the second wheel speed. The processor compares the calculated difference to a predetermined difference (e.g., 3 RPM).

In act 706, the processor prevents movement of an electrically powered component of the bicycle based on the identifying. For example, movement of the electrically powered component may be prevented based on the comparison of the first wheel speed to the second wheel speed. In other words, when the calculated difference is greater than the predetermined difference (e.g., greater than 3 RPM), the processor prevents movement of the electrically powered component.

The prevention by the processor in act 706 may be overridden with a user input. For example, the processor may receive a user input or a signal generated by a user input (e.g., user interaction with one or more buttons at the handlebars), and may allow the movement of electrically powered component of the electric bicycle (e.g., actuate a motor) based on, for example, the received user input.

In one embodiment, a number of sensors may be used to positively determine if the bicycle is actively being ridden, is in work stand, or is being walked. The sensors may include: one or more pressure sensors in the saddle and configured to detect rider weight; strain gauges in one of the crank arms or a bottom bracket to detect torque from legs of the rider; and/or strain gauges in grips or the handlebar configured to detect engagement with the handlebar by the rider.

If the rider crashes or the bike is set on a side, and one or more of the wheels are still turning, the method described above may recognize this as valid input and attempt to shift or run the motor overdrive function. To prevent this, an accelerometer in the rear derailleur may be used to determine orientation of the bicycle. While the derailleur is awake, the derailleur may take accelerometer readings at intervals (e.g., frequent intervals such as every 100 ms). By averaging these readings over a finite history (e.g., as a low pass filter), the orientation of the bicycle may be determined. The accuracy and response time of the orientation sensing functions may be increased by also using a gyroscope to complement the accelerometer data. The orientation sensors and functions may also exist in the e-bike system, a shifter, an electronic seatpost, or a standalone device used for detecting orientation.

The combination of wheel speed, crank cadence, and rider torque may be used in combination to determine if the bicycle is being lightly pedaled in a work stand or is actively being ridden. If the wheel speed accelerates from zero to some significant value that would trigger an automatic shift, the amount of energy input by the rider to achieve this speed may be used to determine if the bicycle is actively being ridden by the integral $\Sigma_0^{t\_elapsed} \tau(t)*\omega(t)dt$. If the energy used to accelerate the rider and bicycle is below a predetermined threshold, it may be inferred that the bicycle may be being pushed or pedaled in a stand. This assumption may not be valid if the bicycle starts moving down an incline. An accelerometer or other orientation-sensing device may be used to supplement this decision. The processor may calculate the amount of energy and compare the calculated energy to the predetermined threshold. The predetermined threshold may be set based on experimental data.

If the bicycle is being pedaled in a bicycle stand, the wheel acceleration would not correlate with acceleration observed by an inertial measurement (IMU) unit or accelerometer. If sufficient wheel speed acceleration to IMU acceleration correlation is not satisfied, the processor may disable the automatic shifting functions.

Figure 8:
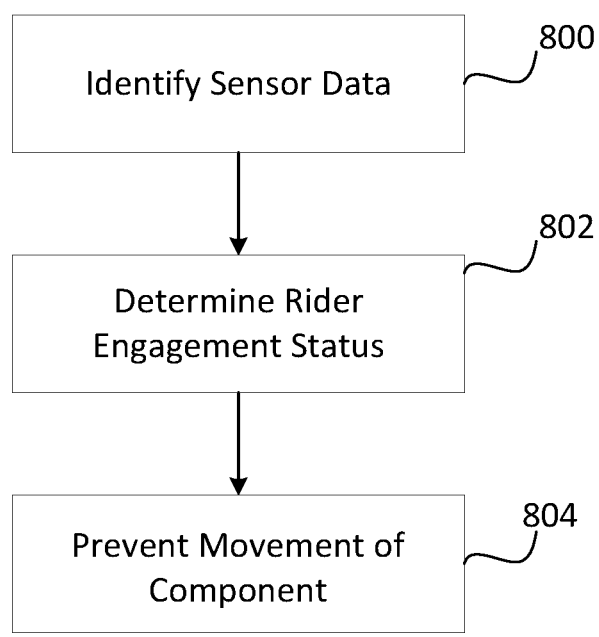
FIG. 8 is a flowchart of yet another embodiment of a method for controlling one or more components of a bicycle.

FIG. 8 is a flowchart of another embodiment of a method for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

In act 800, a processor that is in communication with an electrically powered component of the bicycle identifies sensor data. The sensor data identifies a state of the bicycle. The electrically powered component may be any number of electrically powered components of the bicycle including, for example, an assist motor for an ebike or a derailleur motor for automatic shifting. In one embodiment, the method is applied to more than one electrically powered component in parallel. For example, the method may stop or prevent movement of both the assist motor and the motor of the derailleur.

In one embodiment, identifying the sensor data includes receiving, by the processor, orientation data from one or more orientation sensors of the bicycle. For example, the processor may receive orientation data from at least one accelerometer. The processor may receive the orientation data from the at least one accelerometer continuously or at a predetermined interval.

Alternatively or additionally, identifying the sensor data includes receiving wheel speed data from one or more wheel speed sensors of the bicycle, receiving crank speed data from one or more cadence sensors, receiving strain data from one or more strain gauges of the bicycle, receiving acceleration data from one or more accelerometers and/or one or more gyroscopes, or any combination thereof.

In act 802, the processor determines a rider engagement status based on the identified sensor data. For example, the processor determines an orientation of the bicycle based on the received orientation data and determines whether a user is riding the bicycle based on the determined orientation of the bicycle.

In one embodiment, determining the orientation of the bicycle includes the processor averaging a portion of the received orientation data (e.g., for a predetermined time period such as 0.5 s, 1.0 s, 2.0 s) and determining the orientation of the bicycle based on the averaged portion of the received orientation data.

In one embodiment, the processor determines whether the bicycle is subject to a predetermined deacceleration as the rider engagement status based on the identified sensor data. For example, the sensor data may be acceleration data from one or more accelerometers and/or gyroscopes of the bicycle, and the processor may calculate a deacceleration based on the sensor data. The processor may compare the calculated deacceleration to the predetermined deacceleration and identify the rider engagement status based on the comparison.

In act 804, the processor stops or prevents movement of the electrically powered component based on the determined rider engagement status. In one embodiment, movement of the electrically powered component is stopped or prevented when the determined rider engagement status indicates the user is not riding the bicycle. In another embodiment, movement of the electrically powered component is stopped or prevented when the processor determines the bicycle is subject to the predetermined deacceleration. Other rider engagement statuses may be determined and used for act 804.

Figure 9:
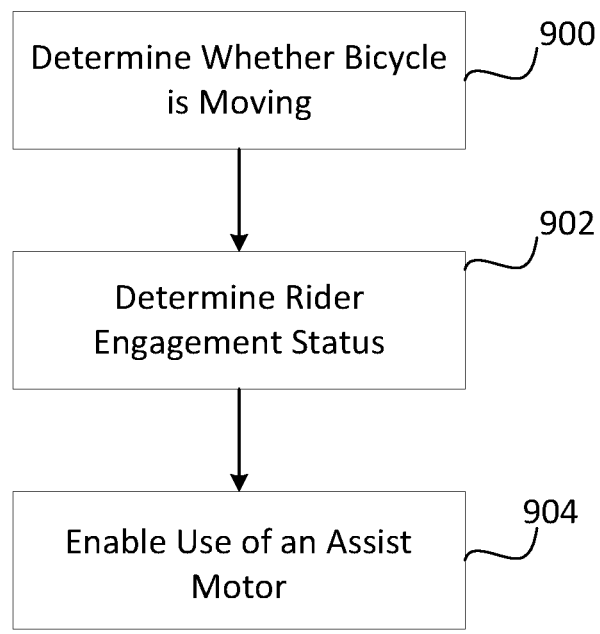
FIG. 9 is a flowchart of another embodiment of a method for controlling one or more components of a bicycle.

FIG. 9 is a flowchart of yet another embodiment of a method for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

In act 900, a processor determines whether the bicycle is moving based on first sensor data received from a first sensor of the bicycle. For example, the processor receives, as the first sensor data, wheel speed data from a wheel speed sensor of the bicycle.

In act 902, when the bicycle is determined to be moving, the processor determines a rider engagement status. The determining of the rider engagement status includes identifying, by the processor, second sensor data from a second sensor of the bicycle and identifying, by the processor, third sensor data from a third sensor of the bicycle. For example, the processor receives, as the second sensor data, crank strain data from a strain gauge, for example, at a crank of the bicycle, and receives, as the third sensor data, crank speed data from a crank speed sensor.

The processor determines the rider engagement status based on the second sensor data and the third sensor data. For example, the processor calculates an input power based on the received crank strain data and the received crank speed data and compares the calculated input power to a predetermined threshold power (e.g., indicating the bicycle is being pedaled by a rider, not by hand). The processor may determine the rider engagement status based on the comparison of the calculated input power to the predetermined threshold power. For example, the processor may determine the rider engagement status as the bicycle being ridden by the user when the calculated input power is greater than the predetermined threshold power.

In act 904, when the determined rider engagement status indicates the bicycle is being ridden, the processor enables use of an assist motor for the electronic shifting of the bicycle. In one embodiment, when the determined rider engagement status is that the bicycle is not moving (e.g., without motion), the processor disables the use of the assist motor for the electronic shifting of the bicycle.

In one embodiment, the method further includes the processor identifying a motor current of the assist motor. For example, the processor may identify (e.g., receive) motor current data from one or more sensors of the assist motor. The processor compares the identified motor current of the assist motor to a predetermined maximum motor current. Based on the comparison, the processor disables the use of the assist motor for the electronic shifting of the bicycle when the identified motor current of the assist motor is greater than the predetermined maximum motor current.

Limiting the motor current limits a maximum torque output of the motor to prevent injury or damage if a foreign object (e.g., a stick or finger) is caught in the drivetrain. The automatic shifting (e.g., with or without the assist motor) may remain disabled until the rider is again detected.

Modern cassettes provide an extremely wide gear ratio range so that the rider may easily pedal up steep hills as well as effectively pedal down hills or with a strong tailwind. When a rider begins pedaling from a standstill, it is desirable to be in a low gear but typically not the lowest gear, depending on the gears installed on bike. If the rider is in a very large cog as the bicycle accelerates from a stop on flat ground, the rider will quickly be at an uncomfortably high pedaling cadence. In one embodiment, the derailleur has a configurable minimum cog that the automatic shifting method may not shift beyond as the rider decelerates without pedaling (e.g., coasts) to a low speed or stop.

It is still necessary that the rider be able to access the largest cog(s) when needed (e.g., climbing a steep hill). If the rider is slowing down such that the automatic shifting would select a cog below the minimum configured cog and the user is still pedaling (e.g., not coasting), it may be assumed that there is a functional need for a lower gear and the derailleur may shift. The pedaling load (e.g., bottom bracket torque from rider) may provide an additional input to determine if the bicycle should shift to a lower gear than the configured minimum. The method may require that the rider be pedaling and be applying torque above a minimum threshold to shift to a lower gear than the configured minimum.

When the rider resumes pedaling from a stop (e.g., in a gear above the largest cog) the automatic shifting method attempts to shift down to achieve the target cadence, defeating the purpose of a minimum cog. To prevent this, the processor may calculate an acceleration of the bicycle from a derivative of the speed sensor data. If the bicycle is accelerating above a predetermined threshold, and the target gear is a lower gear than the current gear and within a threshold number of gears from the current gear, the processor may ignore the downshift. Alternatively or additionally, the automatic shifting method may not be reinitiated for a short time period after start of motion from stop (e.g., two seconds).

Figure 10:
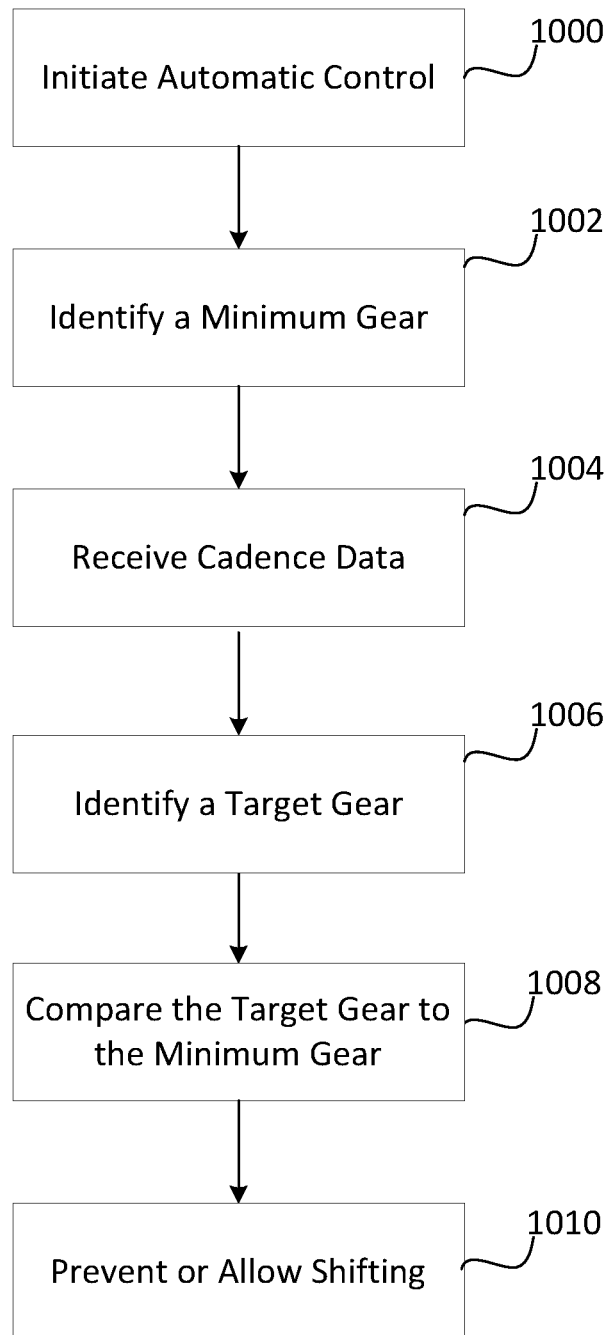
FIG. 10 is a flowchart of an embodiment of a method for controlling one or more components of a bicycle.

In one embodiment, the automatic shifting method is not able to shift to a lowest gear unless the bicycle is riding up an incline (e.g., unless the processor determines the bicycle is riding up the incline). For example, the bicycle may include an IMU or an accelerometer configured to identify when the bicycle is riding up an incline. The automatic shifting method may limit the lowest gear the automatic shifting method may select, and the processor may temporarily remove the limit when the IMU or the accelerometer identifies the incline. Time rear derailleur shift execution with crank position FIG. 10 is a flowchart of an embodiment of a method for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method for controlling one or more electrically powered components of a bicycle, the method comprising:
    identifying, by a processor in communication with an electrically powered component of the one or more electrically powered components, sensor data, the sensor data identifying a state of the bicycle;
    determining, by the processor, a rider engagement status based on the identified sensor data; and stopping or preventing, by the processor, movement of the electrically powered component based on the determined rider engagement status, wherein identifying the sensor data comprises receiving, by the processor, orientation data from one or more orientation sensors of the bicycle, wherein the method further comprises determining, by the processor, an orientation of the bicycle based on the received orientation data, wherein determining the rider engagement status comprises determining whether a user is riding the bicycle based on the determined orientation of the bicycle, and wherein stopping or preventing movement of the electrically powered component based on the rider engagement status comprises stopping or preventing movement of the electrically powered component when the determined rider engagement status indicates the user is not riding the bicycle.

2. The method of claim 1, wherein receiving orientation data from one or more orientation sensors of the bicycle comprises receiving orientation data from at least one accelerometer at a predetermined interval, and wherein determining the orientation of the bicycle comprises:
averaging a portion of the received orientation data; and
determining the orientation of the bicycle based on the averaged portion of the received orientation data.

3. A method for controlling one or more electrically powered components of a bicycle, the method comprising:
identifying, by a processor in communication with an electrically powered component of the one or more electrically powered components, sensor data, the sensor data identifying a state of the bicycle;
determining, by the processor, a rider engagement status based on the identified sensor data; and
stopping or preventing, by the processor, movement of the electrically powered component based on the determined rider engagement status,
wherein determining the rider engagement status based on the identified sensor data comprises determining whether the bicycle is subject to a predetermined deacceleration based on the identified sensor data,
wherein the electrically powered component is an assist motor, and
wherein stopping or preventing movement of the electrically powered component comprises stopping or preventing movement of the assist motor when the determined rider engagement status indicates that the user is subject to the predetermined deacceleration.

4. The method of claim 3, wherein the electrically powered component is a first electrically powered component, and the one or more electrically powered components comprise a second electrically powered component,
wherein the first electrically powered component is an assist motor, and the second electrically powered component is a derailleur motor, and
wherein the method further comprises stopping or preventing, by the processor, movement of the second electrically powered component based on the determined rider engagement status.

5. A method for controlling one or more electrically powered components of a bicycle, the method comprising:
identifying, by a processor in communication with an electrically powered component of the one or more electrically powered components, sensor data, the sensor data identifying a state of the bicycle;
determining, by the processor, a rider engagement status based on the identified sensor data; and
stopping or preventing, by the processor, movement of the electrically powered component based on the determined rider engagement status,
wherein identifying the sensor data comprises:
receiving bicycle orientation data from one or more orientation sensors of the bicycle;
receiving wheel speed data from one or more wheel speed sensors of the bicycle;
receiving crank speed data from one or more cadence sensors;
receiving strain data from one or more strain gauges of the bicycle;
receiving acceleration data from one or more accelerometers, one or more gyroscopes, or a combination thereof; or
any combination thereof.

6. The method of claim 5, wherein the wheel speed data comprises first wheel speed data and second wheel speed data,
wherein identifying the sensor data comprises:
receiving the first wheel speed data from a first wheel speed sensor, the received first wheel speed data representing a first wheel speed, the first wheel speed being a wheel speed of a first wheel of the bicycle; and
receiving the second wheel speed data from a second wheel speed sensor, the received second wheel speed data representing a second wheel speed, the second wheel speed being a wheel speed of a second wheel of the bicycle, and
wherein determining the rider engagement status comprises:
comparing the first wheel speed data to the second wheel speed data; and
determining the rider engagement status based on the comparison.

7. The method of claim 6, wherein comparing the first wheel speed data to the second wheel speed data comprises calculating a difference between the first wheel speed and the second wheel speed, and
wherein determining the rider engagement status based on the comparison comprises determining the rider engagement status based on the calculated difference.

8. The method of claim 7, wherein determining the rider engagement status based on the calculated difference comprises:
comparing the calculated difference to a predetermined difference; and
determining the bicycle is supported off a surface, on which the bicycle is supportable, when the calculated difference is greater than the predetermined difference, and
wherein stopping or preventing movement of the electrically powered component based on the determined rider engagement status comprises stopping or preventing movement of the electrically powered component when the bicycle is determined to be supported off the surface.

9. A method for controlling an electric bicycle, the method comprising:
receiving, by a processor, first sensor data from a first sensor of the electric bicycle;
receiving, by the processor, second sensor data from a second sensor of the electric bicycle;

identifying, by the processor, based on the first sensor data and the second sensor data, whether the electric bicycle is supported, such that a wheel of the electric bicycle is drivable without translation of the electric bicycle; and preventing, by the processor, movement of an electrically powered component of the electric bicycle based on the identifying.

10. The method of claim 9, wherein receiving the first sensor data from the first sensor comprises receiving first wheel speed data from a first wheel speed sensor, the first wheel speed data representing a wheel speed of a first wheel of the electric bicycle, wherein receiving the second sensor data from the second sensor comprises receiving second wheel speed data from a second wheel speed sensor, the second wheel speed data representing a wheel speed of a second wheel of the electric bicycle, wherein the identifying comprises comparing the first wheel speed to the second wheel speed, and wherein preventing movement of the electrically powered component comprises preventing movement of the electrically powered component based on the comparison of the first wheel speed to the second wheel speed.

11. The method of claim 10, wherein comparing the first wheel speed to the second wheel speed comprises determining a difference between the first wheel speed and the second wheel speed, wherein the identifying further comprises comparing the determined difference to a predetermined difference, and wherein preventing movement of the electrically powered component comprises preventing movement of the electrically powered component based on the comparison of the determined difference to the predetermined difference.

12. The method of claim 9, further comprising:
after the preventing of the movement of the electrically powered component of the electric bicycle:
receiving, by the processor, a user input; and
allowing the movement of the electrically powered component of the electric bicycle based on the received user input.

13. The method of claim 9, wherein receiving the first sensor data from the first sensor comprises one of receiving bicycle orientation data from an orientation sensor of the electric bicycle, receiving first wheel speed data from a first wheel speed sensor of the electric bicycle, receiving second wheel speed data from a second wheel speed sensor of the electric bicycle, receiving crank speed data from a cadence sensor of the electric bicycle, receiving strain data from a strain gauge of the electric bicycle, and receiving acceleration data from an accelerometer, a gyroscope, or a combination thereof, and wherein receiving the second sensor data from the second sensor comprises another of receiving bicycle orientation data from an orientation sensor of the electric bicycle, receiving first wheel speed data from a first wheel speed sensor of the electric bicycle, receiving second wheel speed data from a second wheel speed sensor of the electric bicycle, receiving crank speed data from a cadence sensor of the electric bicycle, receiving strain data from a strain gauge of the electric bicycle, and receiving acceleration data from an accelerometer, a gyroscope, or a combination thereof.

14. The method of claim 13, wherein receiving the first sensor data from the first sensor comprises receiving strain data from a strain gauge of a crank arm, a frame, a handlebar, or a seat of the electric bicycle.

15. A method for controlling electronic shifting of a bicycle, the method comprising:
determining, by a processor, whether the bicycle is moving based on first sensor data received from a first sensor of the bicycle;
when the bicycle is determined to be moving, determining, by the processor, a rider engagement status, the determining of the rider engagement status comprising:
identifying, by the processor, second sensor data from a second sensor of the bicycle;
identifying, by the processor, third sensor data from a third sensor of the bicycle;
determining the rider engagement status based on the second sensor data and the third sensor data;
when the determined rider engagement status indicates the bicycle is being ridden, enabling use of an assist motor for the electronic shifting of the bicycle.

16. The method of claim 15, further comprising identifying the first sensor data, identifying the first sensor data comprising receiving wheel speed data from a wheel speed sensor of the bicycle, wherein identifying the second sensor data comprises receiving crank strain data from a strain gauge at a crank of the bicycle, wherein identifying the third sensor data comprises receiving crank speed data from a crank speed sensor of the bicycle, wherein determining the rider engagement status comprises:
calculating, by the processor, an input power based on the received crank strain data and the received crank speed data;
comparing the calculated input power to a predetermined threshold power; and
determining the rider engagement status based on the comparison of the calculated input power to the predetermined threshold power.

17. The method of claim 16, further comprising, when the bicycle is determined to not be moving, disabling the use of the assist motor for the electronic shifting of the bicycle.

18. The method of claim 15, further comprising:
identifying, by the processor, a motor current of the assist motor;
comparing, by the processor, the identified motor current of the assist motor to a predetermined maximum motor current; and
based on the comparison, disabling the use of the assist motor for the electronic shifting of the bicycle when the identified motor current of the assist motor is greater than the predetermined maximum motor current.

* * * * *